(12) United States Patent
Kumagai et al.

(10) Patent No.: US 12,305,970 B2
(45) Date of Patent: May 20, 2025

(54) METHOD FOR ESTIMATING FLANGE DISPLACEMENT AMOUNT IN ROTARY MACHINE, PROGRAM FOR EXECUTING THE METHOD, AND DEVICE FOR PERFORMING THE METHOD

(71) Applicant: MITSUBISHI HEAVY INDUSTRIES, LTD., Tokyo (JP)

(72) Inventors: Satoshi Kumagai, Tokyo (JP); Shunsuke Mizumi, Tokyo (JP); Koji Ishibashi, Tokyo (JP); Masato Kurita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/569,825

(22) PCT Filed: Nov. 30, 2022

(86) PCT No.: PCT/JP2022/044119
§ 371 (c)(1),
(2) Date: Dec. 13, 2023

(87) PCT Pub. No.: WO2023/162384
PCT Pub. Date: Aug. 31, 2023

(65) Prior Publication Data
US 2024/0271924 A1 Aug. 15, 2024

(30) Foreign Application Priority Data
Feb. 25, 2022 (JP) .................. 2022-027444

(51) Int. Cl.
*F01D 25/24* (2006.01)
*F01D 21/00* (2006.01)
*G01B 11/00* (2006.01)

(52) U.S. Cl.
CPC .......... *G01B 11/002* (2013.01); *F01D 21/003* (2013.01); *F01D 25/243* (2013.01); *F05D 2260/31* (2013.01)

(58) Field of Classification Search
CPC ...... F01D 25/24; F01D 25/243; F01D 25/246; F01D 25/28; F01D 21/003;
(Continued)

(56) References Cited

U.S. PATENT DOCUMENTS 6,257,829 B1  7/2001 Seeley et al.
2018/0307205 A1 10/2018 Yashirodai et al.
(Continued)

FOREIGN PATENT DOCUMENTS

JP  2018-178960 A  11/2018
JP  2019-070334 A  5/2019
(Continued)

OTHER PUBLICATIONS

International Search Report dated Jan. 31, 2023, issued in counterpart Application No. PCT/JP2022/044119. (4 pages).

*Primary Examiner* — David E Sosnowski
*Assistant Examiner* — Maxime M Adjagbe
(74) *Attorney, Agent, or Firm* — WHDA, LLP

(57) ABSTRACT

In a method for estimating flange displacement amount, effective three-dimensional coordinate data at a lower first position on a surface continuous with a lower flange surface of a first supported portion and at an upper first position coincident with the lower first position in the horizontal direction on a surface continuous with an upper flange surface are determined. The effective three-dimensional coordinate data at the respective positions are changed such that the effective three-dimensional coordinate data at the lower first position and the effective three-dimensional coordinate data at the upper first position are coincident with
(Continued)

each other. In accordance with a difference between a position in a vertical direction indicated by the effective three-dimensional coordinate data at an upper target position on the upper flange surface after a coordinate change and a position in the vertical direction indicated by the effective three-dimensional coordinate data at a lower target position on the lower flange surface after a coordinate change, displacement amounts of the upper target position and the lower target position in the vertical direction when a state changes from an open state to a fastened state are obtained.

13 Claims, 23 Drawing Sheets

(58) Field of Classification Search
CPC ............. F05D 2220/31; F05D 2230/60; F05D 2260/81; F05D 2260/821; G01B 11/02; G06F 30/23
See application file for complete search history.

(56) References Cited

U.S. PATENT DOCUMENTS

| | | | | |
|---|---|---|---|---|
| 2019/0107007 A1* | 4/2019 | Yashirodai | ............. | G06F 30/17 |
| 2022/0364482 A1* | 11/2022 | Woszczak | ............... | F01D 25/24 |
| 2023/0097598 A1* | 3/2023 | Kumagai | ............... | G01B 11/24 |
| | | | | 29/889.2 |

FOREIGN PATENT DOCUMENTS

| | | | |
|---|---|---|---|
| JP | 6523771 B2 | 6/2019 | |
| JP | 2022-037334 A | 3/2022 | |

* cited by examiner

METHOD FOR ESTIMATING FLANGE DISPLACEMENT AMOUNT IN ROTARY MACHINE, PROGRAM FOR EXECUTING THE METHOD, AND DEVICE FOR PERFORMING THE METHOD

TECHNICAL FIELD

The present disclosure relates to a method for estimating a flange displacement amount on flange surfaces of an upper-half casing and a lower-half casing covering an outer periphery of a rotor in the rotary machine, a program for executing the method, and a device for performing the method.

This application claims priority based on JP 2022-027444 filed in Japan on Feb. 25, 2022, the contents of which are incorporated herein by reference.

BACKGROUND ART

A rotary machine such as a steam turbine includes a rotor rotatable around an axis extending in a horizontal direction, a casing covering an outer periphery of the rotor, and a stationary component such as a diaphragm disposed in the casing and attached to the casing. The casing typically includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction.

At the time of inspection of the rotary machine, the upper-half casing is removed from the lower-half casing to put the rotary machine into an open state, and a plurality of components constituting the rotary machine are inspected and repaired as necessary. The casing of the rotary machine such as a steam turbine may have inelastic deformation such as creep deformation due to the influence of, for example, heat, during operation. For this reason, the lower-half casing and the upper-half casing in the open state after being operated once are deformed from the factory default in a strict sense. Upon completion of the inspection, the plurality of components is assembled. This assembly step includes a step of fastening the upper-half casing to the lower-half casing by using the plurality of bolts to bring them into a fastened state. In the course of bringing the lower-half casing and the upper-half casing from the open state to the fastened state, the lower-half casing and the upper-half casing are further deformed.

A gap in a radial direction between the rotor and the stationary component attached to the casing needs to fall within a predetermined dimensional tolerance range. However, when the casing changes from the open state to the fastened state and the shapes of the lower-half casing and the upper-half casing are changed, the gap in the radial direction between the rotor and the stationary component attached to the casing is changed, and the gap may be out of the dimensional tolerance range.

Thus, in the technique described in the Patent Document 1 below, the deformation amounts of the lower-half casing and the upper-half casing that changes from the open state to the fastened state are estimated by the following steps. First, finite element models related to the three-dimensional shapes of the lower-half casing and the upper-half casing are acquired. Subsequently, three-dimensional shape data of the lower-half casing and the upper-half casing in the open state is acquired by actual measurement. Then, the finite element models are corrected using the measured three-dimensional shape data such that the finite element models match the measured three-dimensional shape data. Next, the fastened state is simulated using the corrected finite element models indicating the open state so as to create finite element models indicating the fastened state. Then, the deformation amounts of predetermined portions of the lower-half casing and the upper-half casing are estimated from the difference between the finite element models indicating the open state and the finite element models indicating the fastened state. The predetermined portions of the lower-half casing and the upper-half casing are the lower flange surface of the lower-half casing and the upper flange surface of the upper-half casing.

That is, the technique described in Patent Document 1 simulates the fastened state by using the finite element models indicating the open state and estimates the displacement amounts of the lower flange surface of the lower-half casing and the upper flange surface of the upper-half casing from the finite element models indicating the fastened state obtained by the simulation.

CITATION LIST

Patent Literature

Patent Document 1: JP 2019-070334 A

SUMMARY OF INVENTION

Technical Problem

The technique described in Patent Document 1 simulates the fastened state by using the finite element models indicating the open state, causing a large calculation load for executing the simulation. For this reason, the technique described in Patent Document 1 has an inherent problem that a preparation period is prolonged and costs for estimating the displacement amounts of the flange surfaces are large.

Therefore, an object of the present disclosure is to provide a technique for reducing the calculation load for estimating displacement amounts of flange surfaces of an upper-half casing and a lower-half casing, allowing a preparation period and costs for the estimation of the flange surfaces to be reduced.

Solution to Problem

A method for estimating a flange displacement amount in a rotary machine as one aspect for achieving the above-described object is applied to a rotary machine below.

The rotary machine includes a rotor rotatable around an axis extending in a horizontal direction, a casing covering an outer periphery of the rotor, a stationary component disposed in the casing and attached to the casing, and a base frame supporting the casing from below. The casing includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction, and a first supported portion and a second supported portion that are continuous with the lower flange, supported by the base frame from below, and separated from each other in an axial direction in which the axis extends. The upper flange and the lower flange include bolt holes penetrating therethrough in the vertical direction, and the respective plurality of bolts can be inserted into the bolt holes.

The method for estimating a flange displacement amount in a rotary machine above performs:

a measured coordinate receiving step of receiving measured three-dimensional coordinate data at a plurality of positions on the upper flange surface and measured three-dimensional coordinate data at a plurality of positions on the lower flange surface, the measured three-dimensional coordinate data being measured in an open state where the upper-half casing is not fastened to the lower-half casing by the plurality of bolts after the rotary machine is disassembled;

an effective coordinate determining step of determining effective three-dimensional coordinate data at a lower first position, a lower second position, and a lower target position by using the measured three-dimensional coordinate data at the plurality of positions on the lower flange surface, the lower first position being coincident with a first representative position of the first supported portion in a horizontal direction on a surface continuous with the lower flange surface, the lower second position being coincident with a second representative position of the second supported portion in the horizontal direction on a surface continuous with the lower flange surface, the lower target position being a position on the lower flange surface from which a displacement amount in a vertical direction when a state changes from the open state to a fastened state where the upper-half casing is fastened to the lower-half casing by the plurality of bolts is to be obtained and determining effective three-dimensional coordinate data at an upper first position, an upper second position, and an upper target position by using the measured three-dimensional coordinate data at the plurality of positions on the upper flange surface, the upper first position being coincident with the first representative position of the first supported portion in the horizontal direction on a surface continuous with the upper flange surface, the upper second position being coincident with the second representative position of the second supported portion in the horizontal direction on a surface continuous with the upper flange surface, and the upper target position being coincident with the lower target position in the horizontal direction on the upper flange surface;

a coordinate change step of changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other, and the effective three-dimensional coordinate data at the lower second position and the effective three-dimensional coordinate data at the upper second position determined in the effective coordinate determining step are coincident with each other;

a displacement amount calculation step of calculating displacement amounts of the upper target position in the vertical direction and the lower target position in the vertical direction when a state changes from the open state to the fastened state in accordance with a difference between a position in the vertical direction indicated by the effective three-dimensional coordinate data at the upper target position after the coordinate change step and a position in the vertical direction indicated by the effective three-dimensional coordinate data at the lower target position after the coordinate change step.

In the present aspect, the displacement amounts of the upper target position and the lower target position in the vertical direction when the casing changes from the open state to the fastened state are calculated in accordance with the difference between the position on the upper flange surface in the vertical direction of the upper target position from which a displacement amount in the vertical direction when the casing changes from the open state to the fastened state is to be obtained and the position on the lower flange surface in the vertical direction of the lower target position from which a displacement amount in the vertical direction when the casing changes from the open state to the fastened state is to be obtained. Accordingly, in the present aspect, the displacement amounts of the upper target position and the lower target position in the vertical direction can be obtained without simulating the deformation of the lower-half casing and the upper-half casing by using finite element models of the lower-half casing and the upper-half casing. Therefore, the present aspect can reduce the calculation load for calculating the displacement amounts.

A program for estimating a flange displacement amount in a rotary machine as one aspect for achieving the above-described object is applied to a rotary machine below.

The rotary machine includes a rotor rotatable around an axis extending in a horizontal direction, a casing covering an outer periphery of the rotor, a stationary component disposed in the casing and attached to the casing, and a base frame supporting the casing from below. The casing includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction, and a first supported portion and a second supported portion that are continuous with the lower flange, supported by the base frame from below, and separated from each other in an axial direction in which the axis extends. The upper flange and the lower flange include bolt holes penetrating therethrough in the vertical direction, and the respective plurality of bolts can be inserted into the bolt holes.

The program for estimating a flange displacement amount in a rotary machine above causes a computer to execute:

a measured coordinate receiving step of receiving measured tree-dimensional coordinate data at a plurality of positions on the upper flange surface and measured three-dimensional coordinate data at a plurality of positions on the lower flange surface, the measured three-dimensional coordinate data being measured in an open state where the upper-half casing is not fastened to the lower-half casing by the plurality of bolts after the rotary machine is disassembled;

an effective coordinate determining step of determining effective three-dimensional coordinate data at a lower first position, a lower second position, and a lower target position by using the measured three-dimensional coordinate data at the plurality of positions on the lower flange surface, the lower first position being coincident with a first representative position of the first supported portion in a horizontal direction on a surface continuous with the lower flange surface, the lower second position being coincident with a second representative position of the second supported portion in the horizontal direction on a surface continuous with the lower flange surface, and the lower target position being a position on the lower flange surface from which a displacement amount in a vertical direction when a state changes from the open state to a fastened state where the upper-half casing is fastened to the lower-half casing by the plurality of bolts is to be obtained and determining effective three-dimensional coordinate data at an upper first position, an upper second position, and an upper target position by using the measured three-dimensional coordinate data at the plurality of positions on the upper flange surface, the upper first position being coincident with the first representative position of the first supported portion in the horizontal direction on a surface continuous with the upper flange surface, the upper second position being coincident with the second representative position of the second supported portion in the horizontal direction on a surface continuous with the upper flange surface, the upper target position being coincident with the lower target position in the horizontal direction on the upper flange surface;

a coordinate change step of changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other and that the effective three-dimensional coordinate data at the lower second position and the effective three-dimensional coordinate data at the upper second position determined in the effective coordinate determining step are coincident with each other;

a displacement amount calculation step of calculating displacement amounts of the upper target position in the vertical direction and the lower target position in the vertical direction when a state changes from the open state to the fastened state in accordance with a difference between a position in the vertical direction indicated by the effective three-dimensional coordinate data at the upper target position after the coordinate change step and a position in the vertical direction indicated by the effective three-dimensional coordinate data at the lower target position after the coordinate change step.

In the present aspect, causing the computer to execute the program can reduce the calculation load for calculating the displacement amounts similar to the one aspect of the method for estimating a flange displacement amount.

A device for a flange displacement amount in a rotary machine as one aspect for achieving the above-described object is applied to a rotary machine below.

The rotary machine includes a rotor rotatable around an axis extending in a horizontal direction, a casing covering an outer periphery of the rotor, a stationary component disposed in the casing and attached to the casing, and a base frame supporting the casing from below. The casing includes an upper-half casing on an upper side, a lower-half casing on a lower side, and a plurality of bolts fastening the upper-half casing to the lower-half casing. The upper-half casing includes an upper flange formed with an upper flange surface facing downward. The lower-half casing includes a lower flange formed with a lower flange surface facing upward and opposing the upper flange surface in the vertical direction, and a first supported portion and a second supported portion that are continuous with the lower flange, supported by the base frame from below, and separated from each other in an axial direction in which the axis extends. The upper flange and the lower flange include bolt holes penetrating therethrough in the vertical direction, and the respective plurality of bolts can be inserted into the bolt holes.

The device for estimating a flange displacement amount in a rotary machine above includes:

a measured coordinate receiving unit configured to receive measured three-dimensional coordinate data at a plurality of positions on the upper flange surface and measured three-dimensional coordinate data at a plurality of positions on the lower flange surface, the measured three-dimensional coordinate data being measured in an open state where the upper-half casing is not fastened to the lower-half casing by the plurality of bolts after the rotary machine is disassembled;

an effective coordinate determining unit configured to determine effective three-dimensional coordinate data at a lower first position, a lower second position, and a lower target position by using the measured three-dimensional coordinate data at the plurality of positions on the lower flange surface, the lower first position being coincident with a first representative position of the first supported portion in a horizontal direction on a surface continuous with the lower flange surface, the lower second position being coincident with a second representative position of the second supported portion in the horizontal direction on a surface continuous with the lower flange surface, and the lower target position being a position on the lower flange surface from which a displacement amount in the vertical direction when a state changes from the open state to a fastened state where the upper-half casing is fastened to the lower-half casing by the plurality of bolts is to be obtained and determine effective three-dimensional coordinate data at an upper first position, an upper second position, and an upper target position by using the measured three-dimensional coordinate data at the plurality of positions on the upper flange surface, the upper first position being coincident with the first representative position of the first supported portion in the horizontal direction on a surface continuous with the upper flange surface, the upper second position being coincident with the second representative position of the second supported portion in the horizontal direction on a surface continuous with the upper flange surface, the upper target position being coincident with the lower target position in the horizontal direction on the upper flange surface;

a coordinate change unit configured to change the effective three-dimensional coordinate data determined by the effective coordinate determining unit such that the effective three-dimensional coordinate data at the lower first position and the effective three-dimensional coordinate data at the upper first position determined by the effective coordinate determining unit are coincident with each other and that the effective three-dimensional coordinate data at the lower second position and the effective three-dimensional coordinate data at the upper second position determined by the effective coordinate determining unit are coincident with each other;

a displacement amount calculation unit configured to calculate displacement amounts of the upper target position in the vertical direction and the lower target position in the vertical direction when a state changes from the open state to the fastened state in accordance with a difference between a position in the vertical direction indicated by the effective three-dimensional coordinate data at the upper target position after change of a coordinate and a position in the vertical direction indicated by the effective three-dimensional coordinate data at the lower target position after a coordinate change.

The present aspect can reduce the calculation load for calculating the displacement amounts similar to the one aspect of the method for estimating a flange displacement amount.

Advantageous Effects of Invention

One aspect of the present disclosure reduces the calculation load for estimating the displacement amounts of the flange surfaces of the upper-half casing and the lower-half casing, allowing a preparation period and costs for the estimation of the flange surfaces to be reduced.

DESCRIPTION OF EMBODIMENTS

Embodiments of a method for estimating a flange displacement amount in a rotary machine, a program for executing the method, and a device for performing the method according to the present disclosure will be described below.

Embodiment of Rotary Machine

A rotary machine in the present embodiment will be described with reference to FIGS. 1 to 5.

Figure 1:
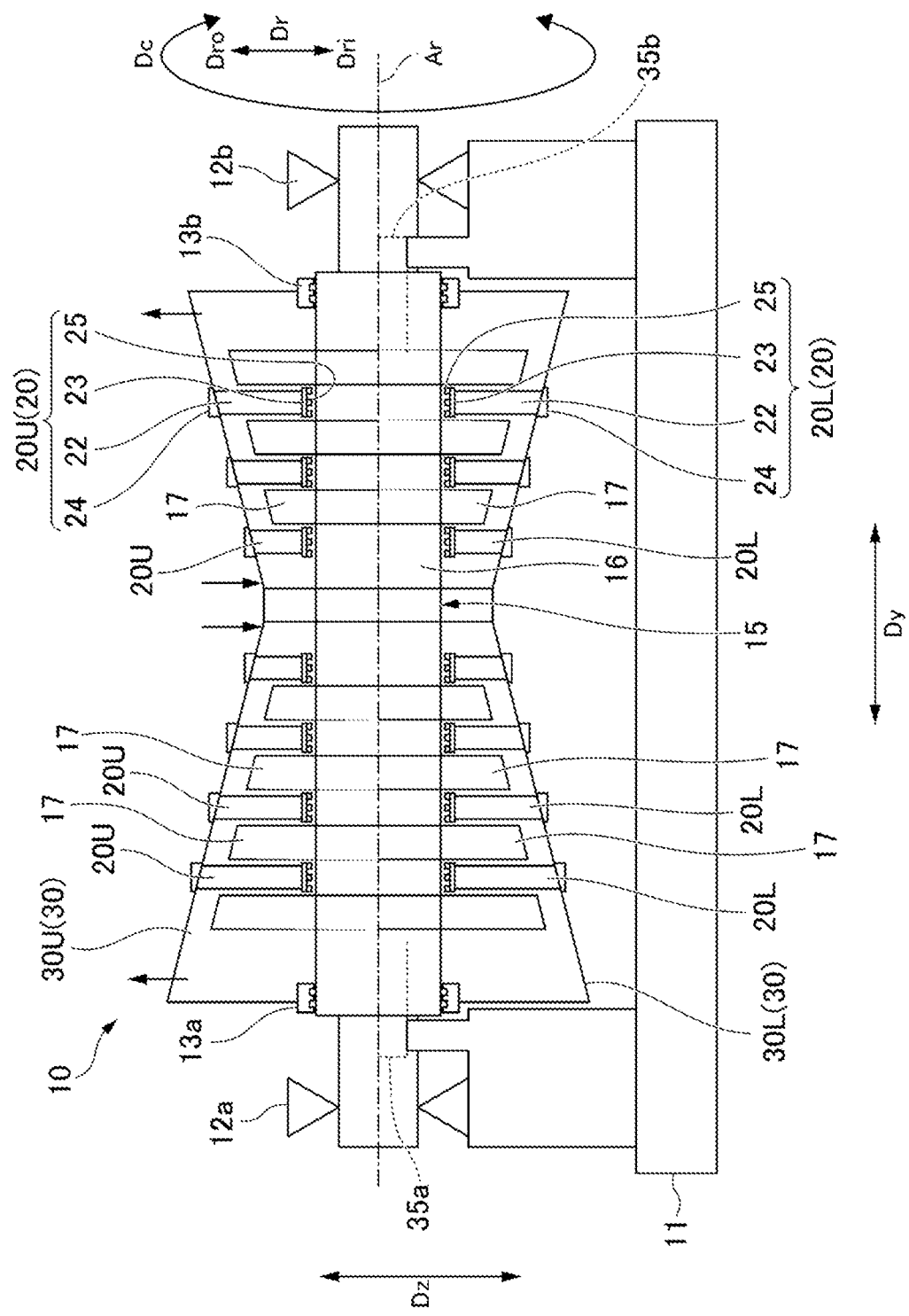
FIG. 1 is a schematic diagram illustrating a schematic configuration of a steam turbine that is a rotary machine according to an embodiment of the present disclosure.
Figure 2:
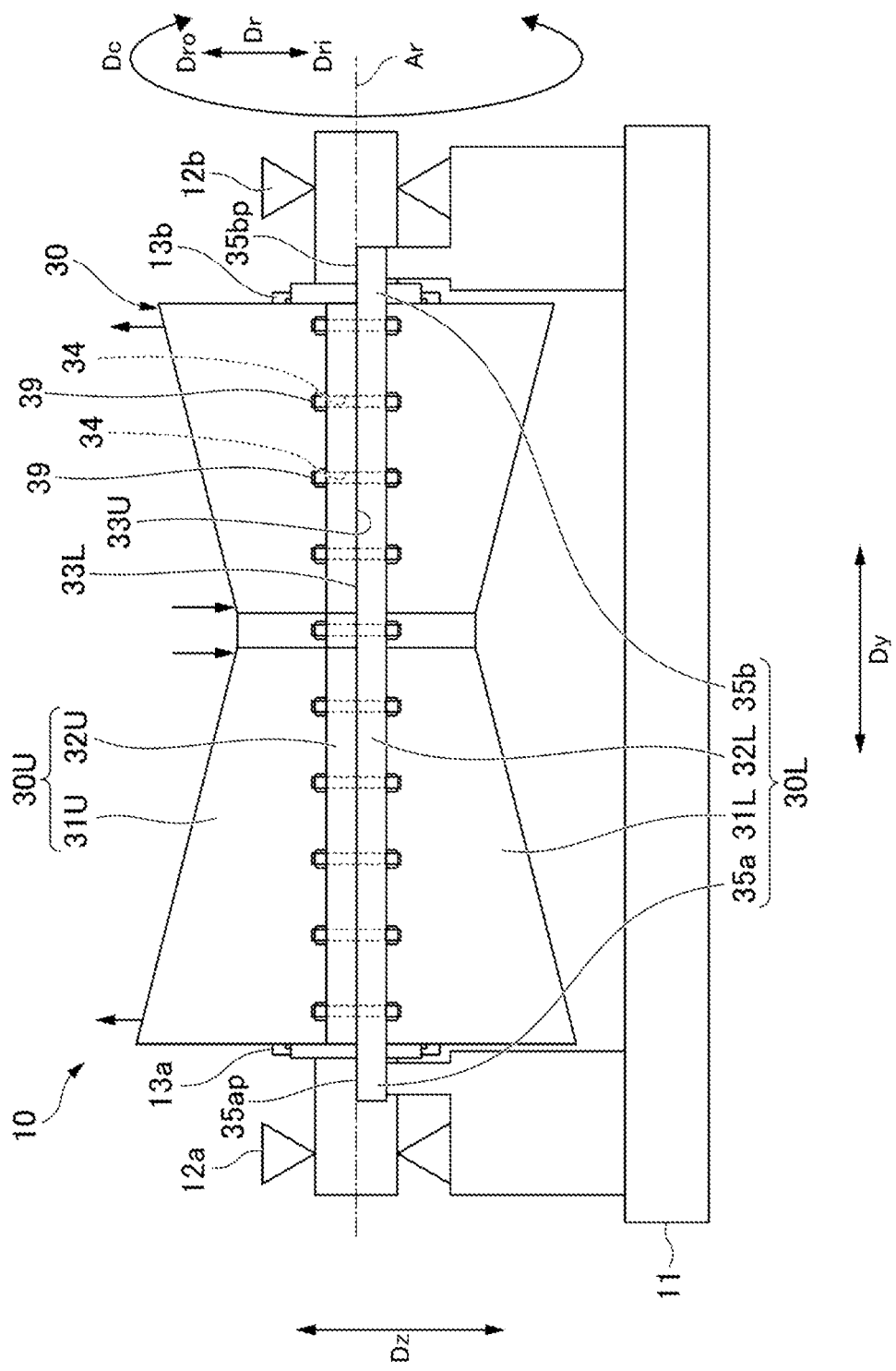
FIG. 2 is a schematic diagram illustrating an outline of a steam turbine that is a rotary machine according to the embodiment the present disclosure.
Figure 3:
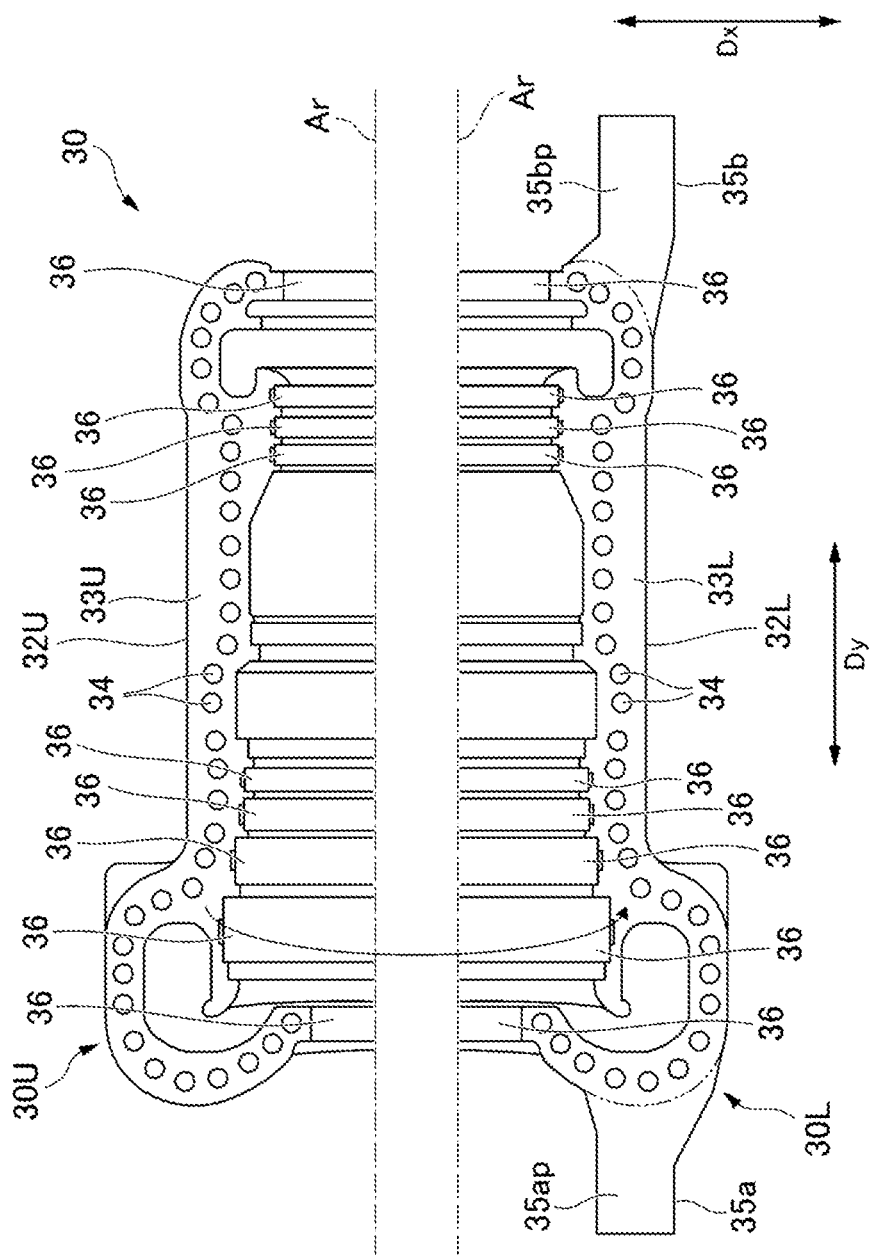
FIG. 3 is a plan view illustrating a main part of an upper-half casing and a main part of a lower-half casing in the embodiment according to the present disclosure.

As illustrated in FIGS. 1 and 2, the rotary machine in the present embodiment is a steam turbine 10. The steam turbine 10 includes a rotor 15 that rotates around an axis Ar extending in the horizontal direction, a casing 30 that covers an outer periphery side of the rotor 15, a first shaft bearing device 12a and a second shaft bearing device 12b that rotatably support the rotor 15, a plurality of diaphragms 20, a first shaft sealing device 13a and a second shaft sealing device 13b that seal gaps between the casing 30 and the rotor 15, and a base frame 11 that supports the casing 30 from below.

Here, a direction in which the axis Ar extends is referred to as an axial direction Dy, a circumferential direction with respect to the axis Ar is simply referred to as a circumferential direction Dc, and a radial direction with respect to the axis Ar is simply referred to as a radial direction Dr. Further, in the radial direction Dr, a side closer to the axis Ar is referred to as a radial inner side Dri, and a side far from the axis Ar is referred to as a radial outer side Dro. In addition, among the reference signs used in the drawings, U means an upper half and L means a lower half.

The rotor 15 includes a rotor shaft 16 extending in the axial direction Dy, and a plurality of rotor blade rows 17 mounted on the rotor shaft 16 along the axial direction Dy. Each of the plurality of rotor blade rows 17 includes a plurality of rotor blades aligned in the circumferential direction Dc with respect to the axis Ar. Both end portions of the rotor shaft 16 protrude from the casing 30 in the axial direction Dy. One end portion of the rotor shaft 16 in the axial direction Dy is rotatably supported by the first shaft bearing device 12a mounted on the base frame 11. The other end portion of the rotor shaft 16 in the axial direction Dy is rotatably supported by the second shaft bearing device 12b mounted on the base frame 11.

The first shaft sealing device 13a is provided at one end portion of the casing 30 in the axial direction Dy. The second shaft sealing device 13b is provided at the other end portion of the casing 30 in the axial direction Dy. Each of the first shaft sealing device 13a and the second shaft sealing device 13b is a device that seals a gap between the rotor shaft 16 and the casing 30.

The plurality of diaphragms 20 are aligned in the axial direction Dy in the casing 30. Each of the plurality of diaphragms 20 includes a lower-half diaphragm 20L that constitutes a portion below the axis Ar and an upper-half diaphragm 20U that constitutes a portion above the axis Ar. Each of the lower-half diaphragm 20L and the upper-half diaphragm 20U includes a plurality of stator vanes 22 aligned in the circumferential direction Dc, a diaphragm inner ring 23 that connects portions of the plurality of stator vanes 22 on the radial inner side Dri to each other, a diaphragm outer ring 24 that connects portions of the plurality of stator vanes 22 on the radial outer side Dro to each other, and a sealing device 25 mounted on the radial inner side Dri of the diaphragm inner ring 23. The sealing device 25 is a sealing device that seals a gap between the diaphragm inner ring 23 and the rotor shaft 16.

Each of the first shaft sealing device 13a, the second shaft sealing device 13b, and the plurality of diaphragms 20 described above is a stationary component that extends in the circumferential direction with respect to the axis Ar and is attached to the casing 30.

As illustrated in FIG. 2, the casing 30 includes a lower-half casing 30L that constitutes a portion below the axis Ar, an upper-half casing 30U that constitutes a portion above the axis Ar, and a plurality of bolts 39 for fastening the upper-half casing 30U to the lower-half casing 30L. The lower-half casing 30L includes a lower-half casing main body 31L extending in the circumferential direction Dc, a lower flange 32L protruding from both end portions of the lower-half casing main body 31L in the circumferential direction Dc toward the radial outer side Dro, and a first supported portion 35a and a second supported portion 35b that are continuous with the lower flange 32L and are supported by the base frame 11 from below. The upper-half casing 30U includes an upper-half casing main body 31U extending in the circumferential direction Dc and an upper flange 32U protruding from both end portions of the upper-half casing main body 31U in the circumferential direction Dc toward the radial outer side Dro. Note that, the upper flange 32U is not provided with portions opposing the first supported portion 35a and the second supported portion 35b of the lower flange 32L. However, the upper flange 32U may be provided with portions opposing the first supported portion 35a and the second supported portion 35b of the lower flange 32L.

As illustrated in FIGS. 2 to 5, a surface of the lower flange 32L facing upward constitutes a lower flange surface 33L. A surface of the upper flange 32U facing downward constitutes an upper flange surface 33U. The lower flange surface 33L and the upper flange surface 33U face each other in a vertical direction Dz.

The first supported portion 35a protrudes from one side of both sides of the lower flange 32L in the axial direction Dy toward the one side. The second supported portion 35b protrudes from the other side of the both sides of the lower flange 32L in the axial direction Dy toward the other side. Thus, the second supported portion 35a is separated from the first supported portion 35b in the axial direction Dy. In the present embodiment, an upper surface 35ap of the first supported portion 35a and an upper surface 35bp of the second supported portion 35b are surfaces continuous with the lower flange surface 33L. That is, the upper surface 35ap of the first supported portion 35a and the upper surface 35bp of the second supported portion 35b are continuous with the lower flange surface 33L with no level difference from the lower flange surface 33L.

The lower flange 32L and the upper flange 32U are formed with bolt holes 34 which penetrate therethrough in the vertical direction Dz, and the respective plurality of bolts 39 can be inserted into the bolt holes 34. The lower-half casing 30L and the upper-half casing 30U are fastened by the bolts 39 inserted into the bolt holes 34 of the lower flange 32L and the bolt holes 34 of the upper flange 32U.

An inside surface of the lower-half casing main body 31L and an inside surface of the upper-half casing 30U are formed with stationary component storage portions 36 in which the respective plurality of stationary components described above is stored. Each of the stationary component storage portions 36 of the lower-half casing main body 31L is a groove that is recessed from the inside surface of the lower-half casing main body 31L toward the radial outer side Dro and extends in the circumferential direction Dc. Each of the stationary component storage portions 36 of the upper-half casing main body 31U is a groove that is recessed from the inside surface of the upper-half casing main body 31U toward the radial outer side Dro and extends in the circumferential direction Dc. The diaphragm 20, which is one of the stationary components, is supported by a portion near the flange surface of the stationary component storage portion 36 extending in the circumferential direction Dc.

Figure 4:
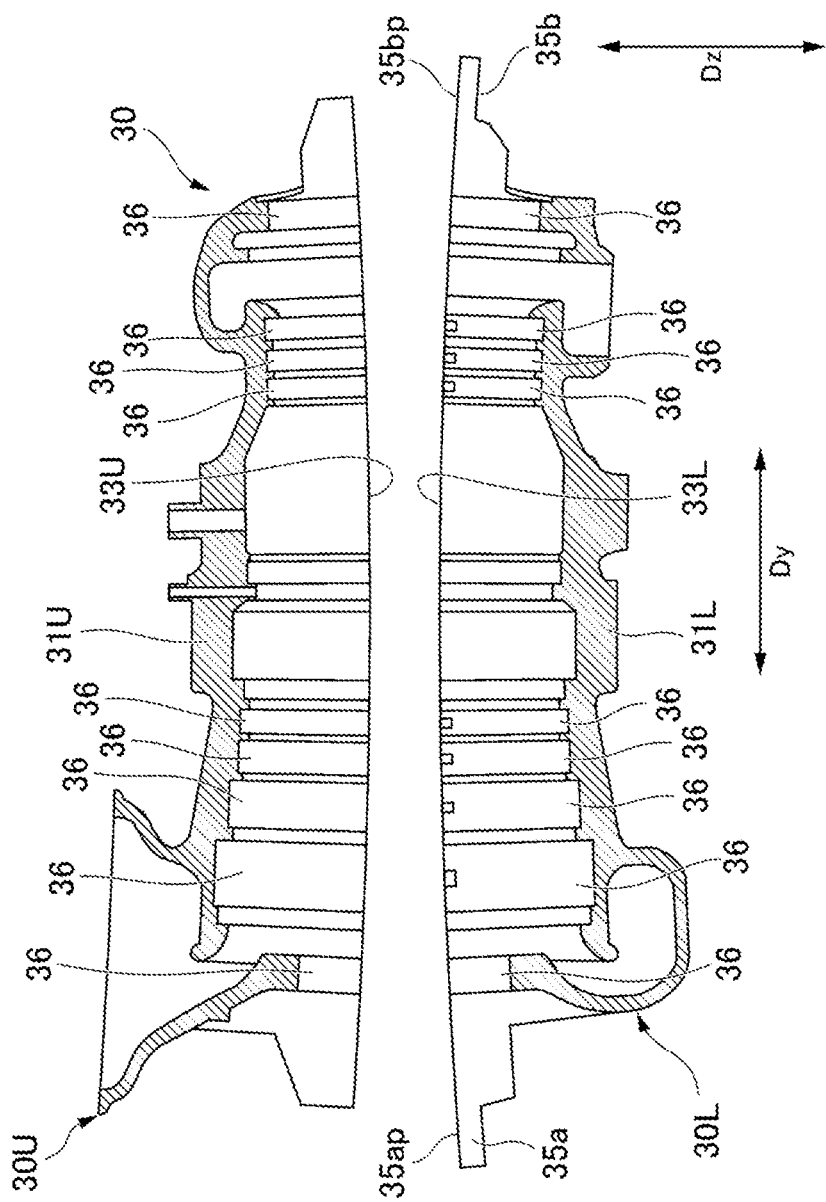
FIG. 4 is a cross-sectional view illustrating a casing in an open state in the embodiment according to the present disclosure.

An inside surface of the casing 30 is exposed to high-temperature steam generated by the operation of the steam turbine 10. Thus, the casing 30 may undergo inelastic deformation such as creep deformation due to the operation of the steam turbine 10. As a result of this deformation, in the open state where the upper-half casing 30U is not fastened to the lower-half casing 30L, the positions of the lower flange surface 33L and the upper flange surface 33U in the vertical direction Dz are shifted according to a location in the axial direction Dy as illustrated in FIG. 4.

Figure 5:
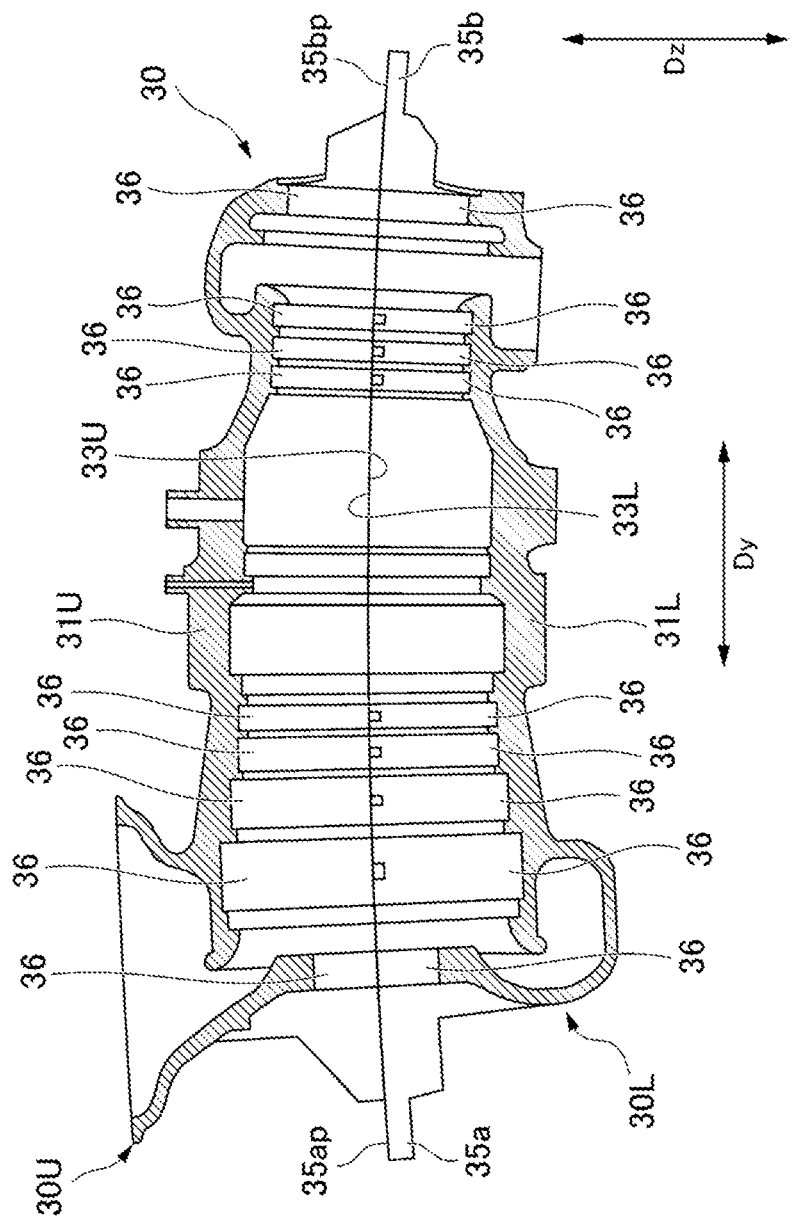
FIG. 5 is a cross-sectional view illustrating the casing in a fastened state in the embodiment according to the present disclosure.

When the upper-half casing 30U deformed as described above is fastened to the lower-half casing 30L deformed as described above to bring the casing 30 into the fastened state, the positions of the lower flange surface 33L and the upper flange surface 33U in the vertical direction Dz are further shifted according to a location in the axial direction Dy as illustrated in FIG. 5.

Gaps in the radial direction Dr between the stationary components attached to the casing 30 and the rotor 15 need to fall within a predetermined dimensional tolerance range. For example, a gap between the rotor shaft 16 and each of the first shaft sealing device 13a and the second shaft sealing device 13b, which are stationary components, and a gap between the rotor shaft 16 and the sealing device 25 of the diaphragm 20 need to fall within a predetermined dimensional tolerance range. However, even if there are shape data of the lower-half casing 30L and shape data of the upper-half casing 30U in the open state, when the casing 30 changes from the open state to the fastened state and the shapes of the lower-half casing 30L and the upper-half casing 30U are changed, the gaps in the radial direction Dr between the stationary components and the rotor 15 are changed and the gaps may be out of the dimensional tolerance range.

The present inventors have found that changes in the gaps in the radial direction Dr between the stationary components and the rotor 15 due to the deformation of the lower-half casing 30L and the upper-half casing 30U by changing from the open state to the fastened state are dominant over the deformation of the lower flange surface 33L and the upper flange surface 33U. In view of this, the inventors estimate a displacement amount of the lower flange surface 33L and a displacement amount of the upper flange surface 33U by changing from the open state to the fastened state, and grasp the gaps in the radial direction Dr between the stationary components and the rotor 15 in the fastened state in accordance with these displacement amounts.

Hereinafter, a device for estimating a flange displacement amount and a method for estimating a flange displacement amount for estimating the displacement amount of the lower flange surface 33L and the displacement amount of the upper flange surface 33U will be described.

Embodiment of Device for Estimating Flange Displacement Amount

Figure 6:
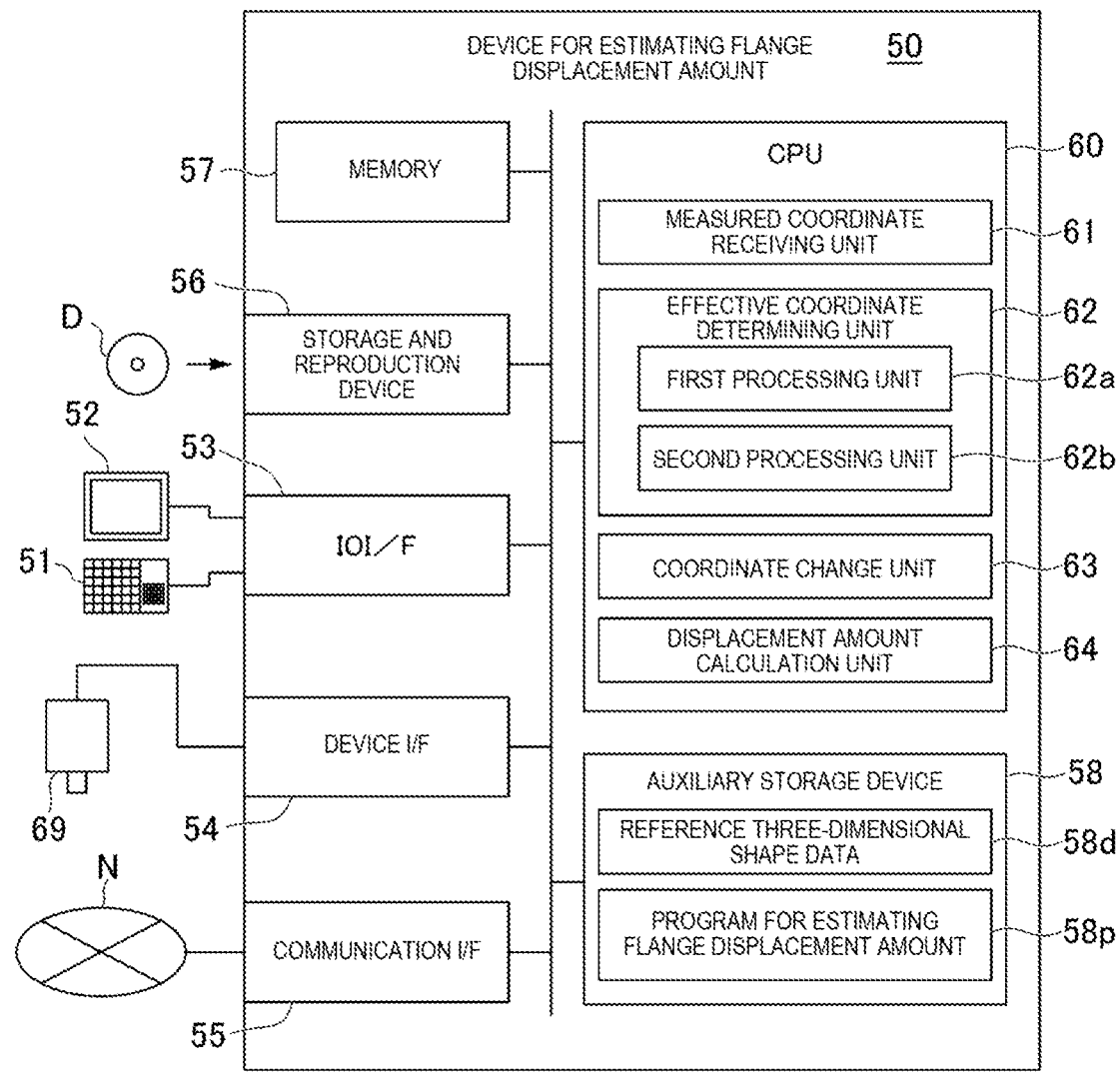
FIG. 6 is a functional block diagram of a device for estimating a flange displacement amount in the embodiment according to the present disclosure.

A device for estimating a flange displacement amount according to the present embodiment will be described with reference to FIG. 6.

A device for estimating a flange displacement amount 50 is a computer. The device for estimating a flange displacement amount 50 includes a central processing unit (CPU) 60 that performs various operations, a memory 57 that serves as a working area or the like for the CPU 60, an auxiliary storage device 58 such as a hard disk drive device, a manual input device (input device) 51 such as a keyboard or a mouse, a display device (output device) 52, an input/output interface 53 for the manual input device 51 and the display device 52, a device interface (input device) 54 for transmitting and receiving data to and from a three-dimensional shape measuring device 69 such as a three-dimensional laser measuring device, a communication interface (input/output device) 55 for communicating with the outside via a network N, and a storage and reproduction device (input/output device) 56 that performs data storage processing and data reproduction processing for a disk storage medium D which is a non-transitory storage medium.

The auxiliary storage device 58 stores in advance a program for estimating a flange displacement amount 58p and reference three-dimensional shape data 58d for each of a plurality of components constituting the steam turbine 10. The reference three-dimensional shape data 58d may be three-dimensional design data or may be, for example, three-dimensional data obtained through actual measurement before the steam turbine 10 is shipped from a factory. That is, the reference three-dimensional shape data 58d only needs to be three-dimensional data obtained ahead of operation before a periodic inspection. Three-dimensional coordinate data at respective positions of the plurality of components can be obtained from the reference three-dimensional shape data 58d. The program for estimating a flange displacement amount 58p is loaded into the auxiliary storage device 58 from the disk storage medium D, which is a non-transitory storage medium, via the storage and reproduction device 56, for example. Note that the program for estimating a flange displacement amount 58p may be loaded into the auxiliary storage device 58 from an external device via the communication interface 55.

The CPU 60 functionally includes a measured coordinate receiving unit 61, an effective coordinate determining unit 62, a coordinate change unit 63, and a displacement amount calculation unit 64. The effective coordinate determining unit 62 includes a first processing unit 62a and a second processing unit 62b. Each of these functional units 61 to 64 is enabled by the CPU 60 executing the program for estimating a flange displacement amount 58p stored in the auxiliary storage device 58. The operations of these functional units 61 to 64 will be described later.

Embodiment of Method for Estimating Flange Displacement Amount

Figure 7:
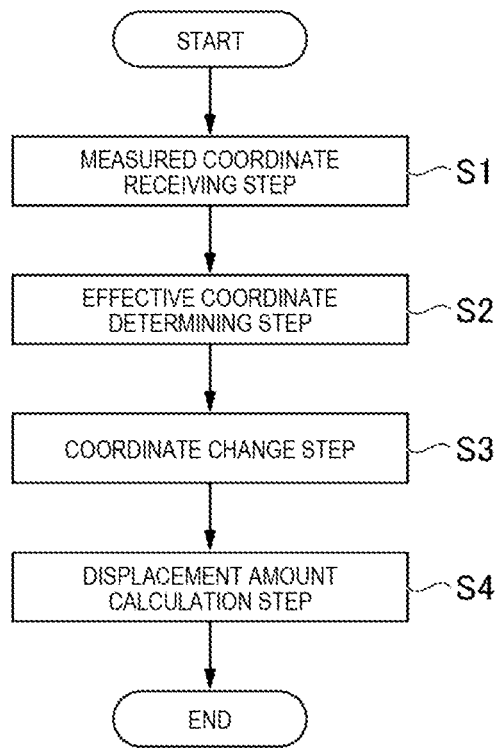
FIG. 7 is a flowchart illustrating a procedure for a method for estimating a flange displacement amount in the embodiment according to the present disclosure.

A method for estimating a flange displacement amount according to the present embodiment will be described in accordance with a flowchart illustrated in FIG. 7. The method for estimating a flange displacement amount is executed by the device for estimating a flange displacement amount described above.

The steam turbine 10 is disassembled and reassembled each time an inspection or the like is performed. When the disassembly of the steam turbine 10 is completed, the upper-half casing 30U is removed from the lower-half casing 30L as illustrated in FIG. 4. As a result, the casing 30 is in the open state where the upper-half casing 30U and the lower-half casing 30L are not fastened by the bolts 39. Further, the rotor 15, the plurality of diaphragms 20, the first shaft sealing device 13a, and the second shaft sealing device 13b are removed from the casing 30 and placed outside the casing 30. Note that, the lower-half casing 30L may be removed from the base frame 11 when the disassembly of the steam turbine 10 is completed, but here, it is assumed that the lower-half casing 30L is supported by the base frame 11.

When the steam turbine 10 is disassembled and the casing 30 is in the open state as described above, an operator measures three-dimensional coordinate values at a plurality of positions on the upper flange surface 33U and three-dimensional coordinate values at a plurality of positions on the lower flange surface 33L by using the three-dimensional shape measuring device 69 such as a three-dimensional laser measuring device. Then, the operator causes the three-dimensional shape measuring device 69 to transfer, as measured three-dimensional coordinate data, the three-dimensional coordinate values at the plurality of positions on the upper flange surface 33U and the three-dimensional coordinate values at the plurality of positions on the lower flange surface 33L to the device for estimating a flange displacement amount 50. The measured coordinate receiving unit 61 of the device for estimating a flange displacement amount 50 receives the measured three-dimensional coordinate data at the plurality of positions on the upper flange surface 33U and the measured three-dimensional coordinate data at the plurality of positions on the lower flange surface 33L (measured coordinate receiving step S1).

The three-dimensional coordinate data according to the present embodiment includes a coordinate value indicating a position in the axial direction Dy extending in the horizontal direction, a coordinate value indicating a position in the vertical direction Dz perpendicular to the axial direction Dy, and a coordinate value indicating a position in a lateral direction Dx perpendicular to the axial direction Dy in the horizontal direction.

Figure 8:
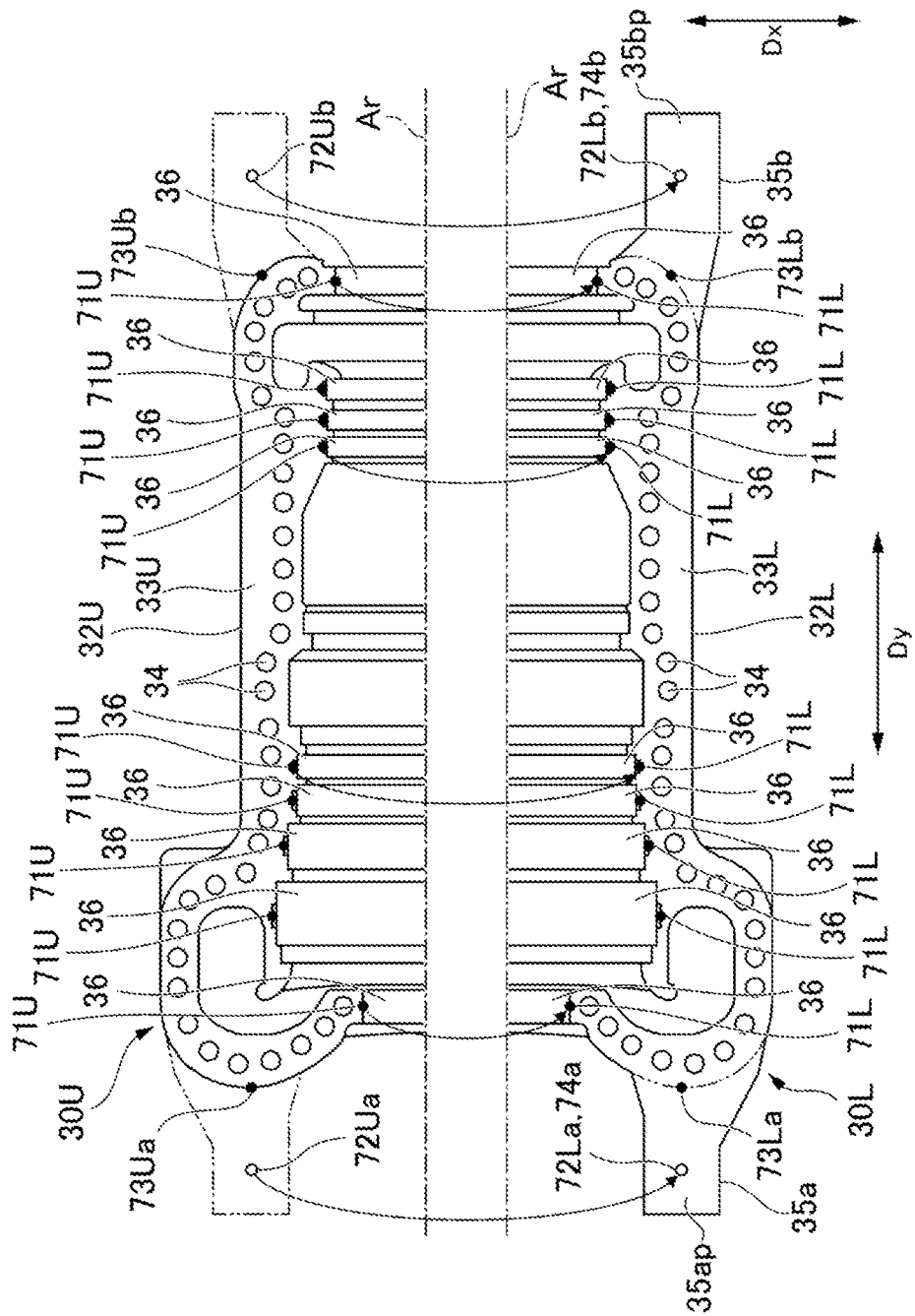
FIG. 8 is an explanatory diagram illustrating positions on a flange surface at which effective three-dimensional coordinate data is determined in the embodiment according to the present disclosure.

When the measured coordinate receiving unit 61 receives a plurality of pieces of the measured three-dimensional coordinate data, the effective coordinate determining unit 62 of the device for estimating a flange displacement amount 50 determines effective three-dimensional coordinate data at a plurality of lower target positions 71L, a lower first position 72La, a lower second position 72Lb, a plurality of upper target positions 71U, an upper first position 72Ua, and an upper second position 72Ub by using the plurality of pieces of the measured three-dimensional coordinate data as illustrated in FIG. 8 (effective coordinate determining step S2). Here, the effective three-dimensional coordinate data are three-dimensional coordinate data of points on the lower flange surface 33L and the upper flange surface 33U including a virtual surface calculated in accordance with the plurality of pieces of the measured three-dimensional coordinate data received. These data are necessary for estimating the displacement amount of the lower flange surface 33L and the displacement amount of the upper flange surface 33U by changing from the open state to the fastened state. A method for determining the effective three-dimensional coordinate data will be described in detail later.

Here, the lower first position 72La is a position that is coincident with a first representative position 74a of the first supported portion 35a in the horizontal direction on a surface continuous with the lower flange surface 33L. The first representative position 74a is a position to which the largest load is applied in the first supported portion 35a. The lower second position 72Lb is a position that is coincident with a second representative position 74b of the second supported portion 35b in the horizontal direction on a surface continuous with the lower flange surface 33L. The second representative position 74b is a position to which the largest load is applied in the second supported portion 35b. The "surface continuous with the lower flange surface 33L" may be an actually existing surface or a virtual surface. In the present embodiment, the upper surface 35ap of the first supported portion 35a and the upper surface 35bp of the second supported portion 35b are surfaces continuous with the lower flange surface 33L. The plurality of lower target positions 71L are positions on the lower flange surface 33L from which displacement amounts in the vertical direction Dz when the casing 30 changes from the open state to the fastened state are to be obtained. Here, the positions on the lower flange surface 33L from which the displacement amounts in the vertical direction Dz are to be obtained are locations on the lower flange surface 33L at which the stationary component storage portions 36 are formed in the axial direction Dy, and are located at inner side edges of the lower flange surface 33L. The upper first position 72Ua is a position that is coincident with the first representative position 74a of the first supported portion 35a in the horizontal direction on a surface continuous with the upper flange surface 33U. The upper second position 72Ub is a position that is coincident with the second representative position 74b of the second supported portion 35b in the horizontal direction on a surface continuous with the upper flange surface 33U. The "surface continuous with the upper flange surface 33U" may be an actually existing surface or a virtual surface. The plurality of upper target positions 71U are positions on the upper flange surface 33U from which displacement amounts in the vertical direction Dz when the casing 30 changes from the open state to the fastened state are to be obtained. Here, the positions on the upper flange surface 33U from which the displacement amounts in the vertical direction Dz are to be obtained are locations on the upper flange surface 33U at which the stationary component storage portions 36 are formed in the axial direction Dy, and are located at inner side edges of the upper flange surface 33U.

Each of the plurality of upper target positions 71U is positionally coincident with one lower target position 71L included in the plurality of lower target positions 71L in the horizontal direction. Here, being positionally coincident in the horizontal direction means not only that coordinate values indicating positions in the axial direction Dy are the same and coordinate values indicating positions in the lateral direction Dx are also the same, but also that coordinate values indicating positions in the axial direction Dy are substantially the same and coordinate values indicating positions in the lateral direction Dx are also substantially the same.

Changes in the gaps in the radial direction Dr between the stationary components and the rotor 15 due to the deformation of the lower-half casing 30L and the upper-half casing 30U by changing from the open state to the fastened state are dominant over the deformation in the positions on the lower flange surface 33L at which the stationary component storage portions 36 are formed in the axial direction Dy and which are located at the inner side edges of the lower flange surface 33L and the deformation in the positions on the upper flange surface 33U at which the stationary component storage portions 36 are formed in the axial direction Dy and which are located at the inner side edges on the upper flange surface 33U. For this reason, the lower target positions 71L from which the displacement amounts in the vertical direction Dz are to be obtained are set to the above-described positions, and the upper target positions 71U from which the displacement amounts in the vertical direction Dz are to be obtained are set to the above-described positions.

Note that each of the lower target positions 71L does not necessarily need to be located at an inner side edge of the lower flange surface 33L, and may be located at, for example, any position within a range from the inner side edge of the lower flange surface 33L to a position corresponding to one third of a flange width in a flange width direction. Similarly, each of the upper target positions 71U does not necessarily need to be located at an inner side edge of the upper flange surface 33U, and may be located at, for example, any position within a range from the inner side edge of the upper flange surface 33U to a position corresponding to one third of a flange width in a flange width direction.

Figure 9:
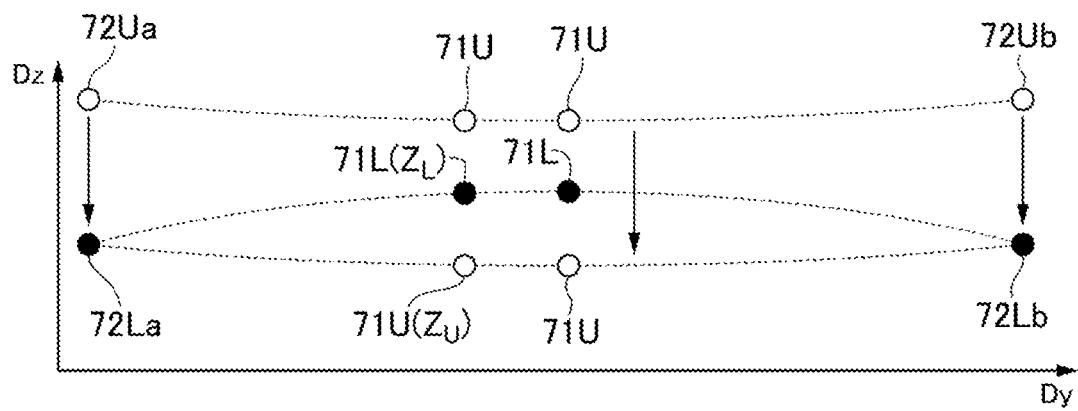
FIG. 9 is an explanatory diagram illustrating a processing content in a coordinate change step in the embodiment according to the present disclosure.

Next, the coordinate change unit 63 of the device for estimating a flange displacement amount 50 changes the effective three-dimensional coordinate data determined by the effective coordinate determining unit 62 (coordinate change step S3). More specifically, as illustrated in FIG. 9, the coordinate change unit 63 changes the effective three-dimensional coordinate data determined by the effective coordinate determining unit 62 by coordinate conversion such as parallel translation and/or rotational transfer such that the effective three-dimensional coordinate data at the lower first position 72La matches the effective three-dimensional coordinate data at the upper first position 72Ua and that the effective three-dimensional coordinate data at the lower second position 72Lb matches the effective three-dimensional coordinate data at the upper second position 72Ub.

Next, the displacement amount calculation unit 64 of the device for estimating a flange displacement amount 50 calculates the displacement amounts in the vertical direction Dz of the lower target positions 71L on the lower flange 32L and the displacement amounts in the vertical direction Dz of the upper target positions 71U on the upper flange 32U by using the effective three-dimensional coordinate data coordinate-changed by the coordinate change unit 63, and outputs these displacement amounts in response to a request from the outside (displacement amount calculation step S4). Specifically, the displacement amount calculation unit 64 uses, as a displacement amount Zd of the lower target position 71L in the vertical direction Dz and the upper target position 71U in the vertical direction Dz one-half of the difference between a coordinate value ZL in the vertical direction Dz included in the effective three-dimensional coordinate data at the lower target position 71L after the coordinate change and a coordinate value ZU in the vertical direction Dz included in the effective three-dimensional coordinate data at the upper target position 71U after the coordinate change as indicated by the following equation.

$$Zd = (ZL - ZU)/2$$

This is the end of the estimation of the displacement amounts in the vertical direction Dz at the lower target positions 71L of the lower flange 32L and the displacement amounts in the vertical direction Dz at the lower target positions 71L of the upper target positions 71U by the device for estimating a flange displacement amount 50.

Next, a plurality of types of methods for determining effective three-dimensional coordinate data in the effective coordinate determining unit 62 will be described.

First Determining Method

In the first determining method, the first processing unit 62a of the effective coordinate determining unit 62 performs the first processing step and the second processing unit 62b of the effective coordinate determining unit 62 performs the second processing step to determine the effective three-dimensional coordinate data at the lower first position 72La, the lower second position 72Lb, the plurality of lower target positions 71L, the upper first position 72Ua, the upper second position 72Ub, and the plurality of upper target positions 71U.

In the first processing step, the first processing unit 62a of the effective coordinate determining unit 62 determines the effective three-dimensional coordinate data at the plurality of lower target positions 71L, a lower edge first position 73La, a lower edge second position 73Lb, the plurality of upper target positions 71U, an upper edge first position 73Ua, and an upper edge second position 73Ub as illustrated in FIG. 8. Here, the lower edge first position 73La is a position on the lower flange surface 33L located at the boundary with the first supported portion 35a. The lower edge second position 73Lb is a position on the lower flange surface 33L located at the boundary with the second supported portion 35b. The upper edge first position 73Ua is a position on the upper flange surface 33U which is coincident with the lower edge first position 73La in the horizontal direction. The upper edge second position 73Ub is a position on the upper flange surface 33U which is coincident with the lower edge second position 73Lb in the horizontal direction.

When the first determining method is performed in the effective coordinate determining step S2, the measured three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub are received in the measured coordinate receiving step S1. In the effective coordinate determining step S2, the first processing unit 62a uses the measured three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub received in the measured coordinate receiving step S1 as the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub as is.

The effective coordinate determining unit 62 can obtain, from the reference three-dimensional shape data 58d stored in the auxiliary storage device 58, three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub when the reference three-dimensional shape data 58d is created. Then, the effective coordinate determining unit 62 recognizes the measured three-dimensional coordinate data of one lower target position 71L from among the measured three-dimensional coordinate data at the plurality of positions received by the measured coordinate receiving unit 61, for example, in the following manner. The effective coordinate determining unit 62 extracts, from the measured three-dimensional coordinate data at the plurality of positions received by the measured coordinate receiving unit 61, measured three-dimensional coordinate data that matches three-dimensional coordinate data of the one lower target position 71L indicated by the reference three-dimensional shape data 58d in terms of coordinate values in the horizontal direction, and recognizes the extracted measured three-dimensional coordinate data as the measured three-dimensional coordinate data of the one lower target position 71L.

In the second processing step, the second processing unit 62b of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62b estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

Figure 10:
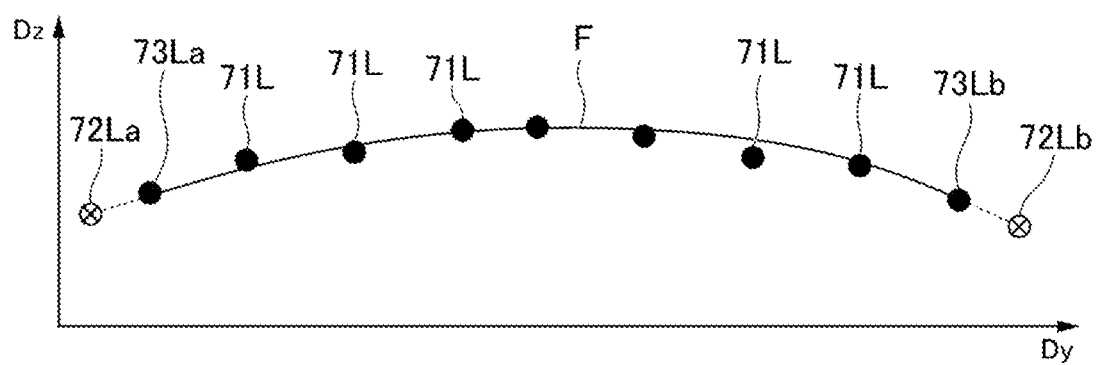
FIG. 10 is an explanatory diagram illustrating a processing content in a second processing step in the embodiment according to the present disclosure.

When estimating the effective three-dimensional coordinate data at the lower first position 72La and the lower second position 72Lb, the second processing unit 62b uses the effective three-dimensional coordinate data at the plurality of lower target positions 71L, the lower edge first position 73La, and the lower edge second position 73Lb to obtain a high-order function F, such as a quadratic function, that approximates a surface shape of the lower flange surface 33L as illustrated in FIG. 10. The second processing unit 62b uses the high-order function F to obtain a coordinate value in the vertical direction Dz corresponding to a coordinate value in the horizontal direction of the lower first position 72La indicated by the reference three-dimensional shape data 58d by extrapolation. Then, the second processing unit 62b replaces a coordinate value in the vertical direction Dz among coordinate values in the respective directions relating to the lower first position 72La indicated by the reference three-dimensional shape data 58d with the obtained coordinate value in the vertical direction Dz, and uses the data after the replacement as the effective three-dimensional coordinate data of the lower first position 72La. Further, the second processing unit 62b uses the high-order function F to obtain a coordinate value in the vertical direction Dz corresponding to a coordinate value in the horizontal direction of the lower second position 72Lb indicated by the reference three-dimensional shape data 58d. Then, the second processing unit 62b replaces a coordinate value in the vertical direction Dz among coordinate values in the respective directions relating to the lower second position 72Lb indicated by the reference three-dimensional shape data 58d with the obtained coordinate value in the vertical direction Dz, and uses the data after the replacement as the effective three-dimensional coordinate data of the lower second position 72Lb. The second processing unit 62b obtains effective three-dimensional coordinate data of the upper first position 72Ua and the upper second position 72Ub in the same manner as described above.

Figure 11:
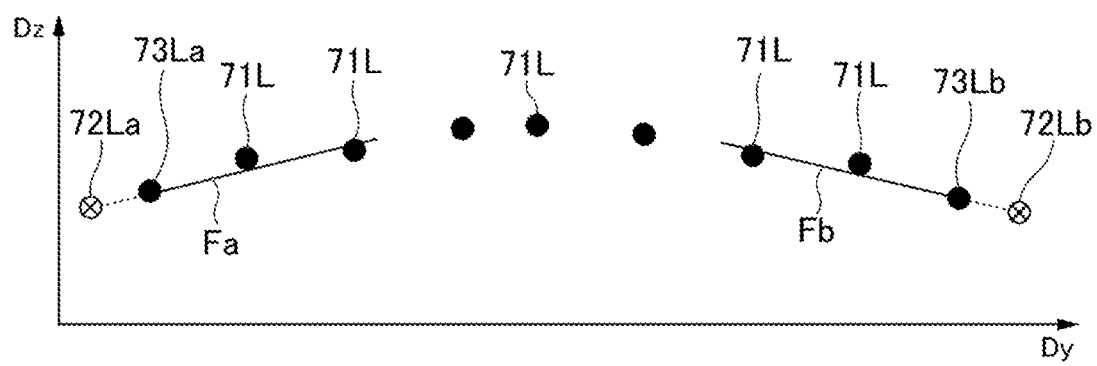
FIG. 11 is an explanatory diagram illustrating another processing content in the second processing step in the embodiment according to the present disclosure.

In the above description, the surface shapes of the lower flange surface 33L and the upper flange surface 33U are approximated by the high-order function F. However, as illustrated in FIG. 11, the surface shape of a part of the lower flange surface 33L or the surface shape of a part of the upper flange surface 33U may be approximated by a linear function. In that case, the second processing unit 62b approximates the surface shape of the lower flange surface 33L near the lower edge first position 73La by a linear function Fa by using the effective three-dimensional coordinate data at a plurality of lower target positions 71L close to the lower edge first position 73La among the plurality of lower target positions 71L and the effective three-dimensional coordinate data at the lower edge first position 73La. Then, the coordinate value of the lower first position 72La in the vertical direction Dz is obtained by using the linear function Fa. Further, the second processing unit 62b approximates the surface shape of the lower flange surface 33L near the lower edge second position 73Lb by a linear function Fb by using the effective three-dimensional coordinate data at a plurality of lower target positions 71L close to the lower edge second position 73Lb among the plurality of lower target positions 71L and the effective three-dimensional coordinate data at the lower edge second position 73Lb. Then, the coordinate value of the lower second position 72Lb in the vertical direction Dz is obtained by using the linear function Fb.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

As described above, in the first determining method, the number of pieces of three-dimensional coordinate data to be handled can be reduced, and thus the time and effort for an operator to measure three-dimensional coordinate values and the calculation load on a computer can be reduced.

In the above description, the coordinate values of the lower first position 72La and the lower second position 72Lb in the vertical direction Dz are estimated. However, when the measured three-dimensional coordinate data of the lower first position 72La on the upper surface 35ap of the first supported portion 35a that is continuous with the lower flange surface 33L and the measured three-dimensional coordinate data of the lower second position 72Lb on the upper surface 35bp of the second supported portion 35b that is continuous with the lower flange surface 33L are received in the measured coordinate receiving step S1, these measured three-dimensional coordinate data may be used as the effective three-dimensional coordinate data of the lower first position 72La and the effective three-dimensional coordinate data of the lower second position 72Lb as is.

As described above, the upper-half casing 30U may also include a first supported portion and a second supported portion that are continuous with the upper flange 32U. In that case, when measured three-dimensional coordinate data of the upper first position 72Ua on a lower surface of the first supported portion that is continuous with the upper flange surface 33U and measured three-dimensional coordinate data of the upper second position 72Ub on a lower surface of the second supported portion that is continuous with the upper flange surface 33U are received in the measured coordinate receiving step S1, these measured three-dimensional coordinate data may be used as the effective three-dimensional coordinate data of the upper first position 72Ua and the effective three-dimensional coordinate data of the upper second position 72Ub as is.

Second Determining Method

Similar to the first determining method, in the second determining method, and also in a third determining method and a fourth determining method to be described later, the first processing unit 62a of the effective coordinate determining unit 62 performs the first processing step and the second processing unit 62b of the effective coordinate determining unit 62 performs the second processing step. In the second processing steps of the second determining method, the third determining method, and the fourth determining method, substantially the same processing as in the second processing step of the first determining method is performed. Therefore, the first processing step will be mainly described below.

Figure 12:
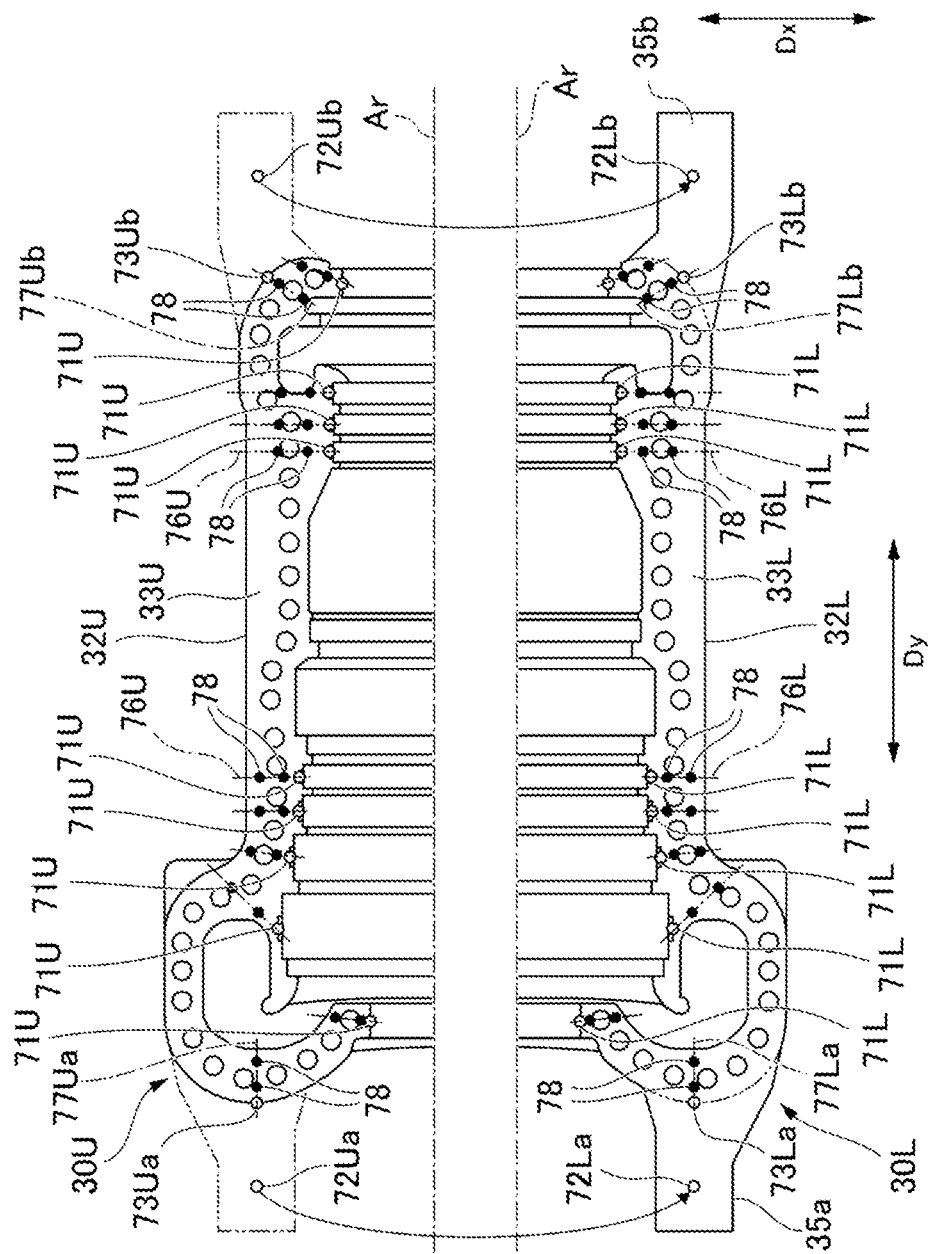
FIG. 12 is an explanatory diagram illustrating positions of measured three-dimensional coordinate data necessary for executing a second determining method in the embodiment according to the present disclosure.

When the second determining method is performed in the effective coordinate determining step S2, measured three-dimensional coordinate data at the following positions illustrated in FIG. 12 are received in the measured coordinate receiving step S1.

a. Measured three-dimensional coordinate data at a plurality of positions 78 on a lower virtual line 76L passing through the lower target position 71L and extending in the flange width direction for each of the plurality of lower target positions 71L
b. Measured three-dimensional coordinate data at a plurality of positions 78 on an upper virtual line 76U passing through the upper target position 71U and extending in the flange width direction for each of the plurality of upper target positions 71U
c. Measured three-dimensional coordinate data at a plurality of positions 78 on a lower first virtual line 77La passing through the lower edge first position 73La and extending in the flange width direction
d. Measured three-dimensional coordinate data at a plurality of positions 78 on a lower second virtual line 77Lb passing through the lower edge second position 73Lb and extending in the flange width direction
e. Measured three-dimensional coordinate data at a plurality of positions 78 on an upper first virtual line 77Ua passing through the upper edge first position 73Ua and extending in the flange width direction
f. Measured three-dimensional coordinate data at a plurality of positions 78 on an upper second virtual line 77Ub passing through the upper edge second position 73Ub and extending in the flange width direction Here, the flange width direction is a direction connecting an outer edge and an inner edge of a flange surface along the flange surface, and is a direction in which a distance from a reference position to the outer edge or the inner edge of the flange surface is shortest. The reference position is each of the upper target position 71U, the lower target position 71L, the lower edge first position 73La, the lower edge second position 73Lb, the upper edge first position 73Ua, and the upper edge second position 73Ub. Further, in the above "Z virtual line passing through YY position and extending in the flange width direction", the "YY position" is "YY position" indicated by the reference three-dimensional shape data 58d. The number of positions on the virtual line whose measured three-dimensional coordinate data are received in the measured coordinate receiving step S1 is, for example, 2 or more and less than 10.

In the first processing step in the second determining method, the first processing unit 62a of the effective coordinate determining unit 62 determines the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub by using the plurality of measured three-dimensional coordinate data received in the measured coordinate receiving step S1. That is, the first processing unit 62a determines the effective three-dimensional coordinate data at all the reference positions described above.

Figure 13:
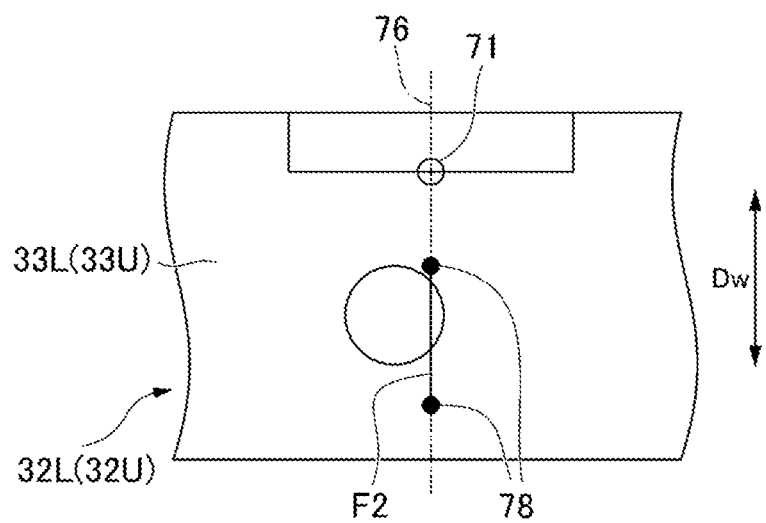
FIG. 13 is an explanatory diagram illustrating a processing content in a first processing step in the case of executing the second determining method in the embodiment according to the present disclosure.

As illustrated in FIG. 13, the first processing unit 62a uses measured three-dimensional coordinate data at a plurality of position 78 on a virtual line 76 passing through a reference position 71 and extending in a flange width direction Dw to obtain a function F2 that approximates coordinate values in the vertical direction Dz at the plurality of positions 78 on the virtual line 76. The first processing unit 62a uses the function F2 to obtain a coordinate value in the vertical direction Dz at the reference position 71 by extrapolation. Then, the first processing unit 62a replaces a coordinate value in the vertical direction Dz among coordinate values in the respective directions relating to the reference position 71 indicated by the reference three-dimensional shape data 58d with the obtained coordinate value in the vertical direction Dz, and uses the data after the replacement as the effective three-dimensional coordinate data of the reference position 71.

Similar to the second processing step in the first determining method, in the second processing step in the second determining method, the second processing unit 62b of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62b estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

In the first determining method, the measured three-dimensional coordinate data at the reference position is used as the effective three-dimensional coordinate data of the reference position as is. Thus, the effective three-dimensional coordinate data at the reference position is likely to be affected by a local shape change, and may include a large measurement error. For example, when the three-dimensional shape measuring device 69 is a three-dimensional laser measuring device, the three-dimensional position data measured by the three-dimensional laser measuring device will include an error when there is a minute floating object between a measurement target and the three-dimensional laser measuring device. On the other hand, in the second determining method, three-dimensional coordinate data of the reference position 71 is estimated in accordance with measured three-dimensional coordinate data at a plurality of positions, and the estimated three-dimensional coordinate data is used as effective three-dimensional coordinate data. Thus, the second determining method is less likely to be affected by a local shape change than the first determining method, and can reduce the possibility of including a large measurement error.

In the above description, the coordinate values of the lower first position 72La and the lower second position 72Lb in the vertical direction Dz are estimated. However, when the following measured three-dimensional coordinate data are received in the measured coordinate receiving step S1, the effective three-dimensional coordinate data of the lower first position 72La and the lower second position 72Lb may be obtained by using these measured three-dimensional coordinate data in the same manner as the method of obtaining the effective three-dimensional coordinate data of the reference position 71 described above.

a. Measured three-dimensional coordinate data at a plurality of positions on a virtual line passing through the lower first position 72La and extending in a protruding direction of the first supported portion 35a
b. Measured three-dimensional coordinate data at a plurality of positions on a virtual line passing through the lower second position 72Lb and extending in a protruding direction of the second supported portion 35b

Here, the protruding directions of the supported portions 35a and 35b are directions in which the supported portions 35a and 35b protrude from the flange along the upper surfaces 35ap and 35bp of the supported portions 35a and 35b.

Figure 14:
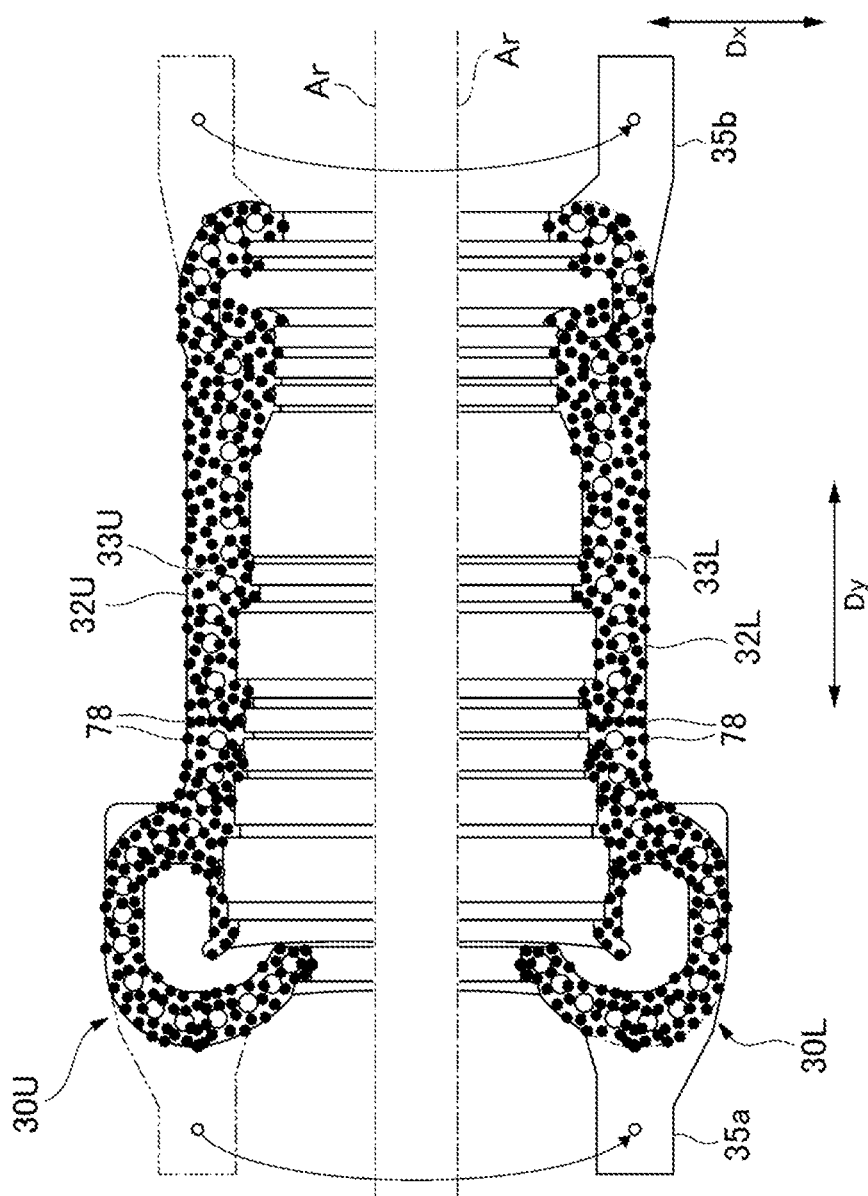
FIG. 14 is an explanatory diagram illustrating positions of measured three-dimensional coordinate data necessary for executing a third determining method in the embodiment according to the present disclosure.
Figure 15:
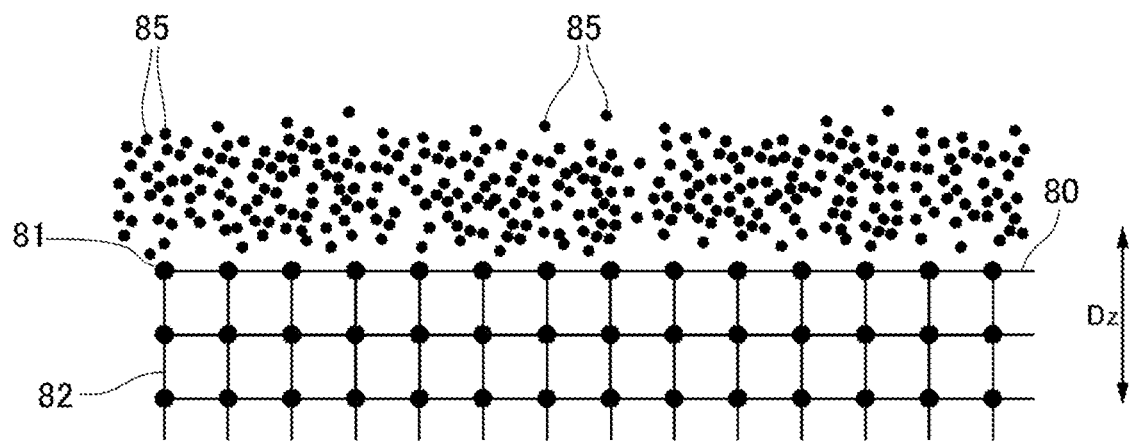
FIG. 15 is an image diagram illustrating a relative positional relationship between a flange surface indicated by reference three-dimensional shape data and points indicated by measured three-dimensional coordinate data at a plurality of positions on an actual flange surface in the case of executing the third determining method in the embodiment according to the present disclosure.

As described above, the upper-half casing 30U may also include a first supported portion and a second supported portion that are continuous with the upper flange 32U. In that case, when the following measured three-dimensional coordinate data are received in the measured coordinate receiving step S1, the effective three-dimensional coordinate data at the upper first position 72Ua and the upper second position 72Ub may be obtained by using these measured three-dimensional coordinate data in the same manner as the method of obtaining the effective three-dimensional coordinate data of the reference position described above.

a. Measured three-dimensional coordinate data at a plurality of positions on a virtual line passing through the upper first position 72Ua and extending in a protruding direction of the first supported portion b. Measured three-dimensional coordinate data at a plurality of positions on a virtual line passing through the upper second position 72Ub and extending in a protruding direction of the second supported portion Third Determining Method When the third determining method is performed in the effective coordinate determining step S2, measured three-dimensional coordinate data at a plurality of positions 78 over the entire lower flange surface 33L and measured three-dimensional coordinate data at a plurality of positions over the entire upper flange surface 33U are received in the measured coordinate receiving step S1 as illustrated in FIGS. 14 and 15. Note that FIG. 15 is an image diagram illustrating the relative positional relationship between a flange surface 80 and reference positions 81 indicated by the reference three-dimensional shape data 58d and points 85 indicated by measured three-dimensional coordinate data at a plurality of positions over the entire actual flange surface.

Similar to the first processing steps in the determining methods described above, also in the first processing step in the third determining method, the first processing unit 62a of the effective coordinate determining unit 62 determines the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub. That is, the first processing unit 62a determines the effective three-dimensional coordinate data at all the reference positions 71 described above.

Figure 16:
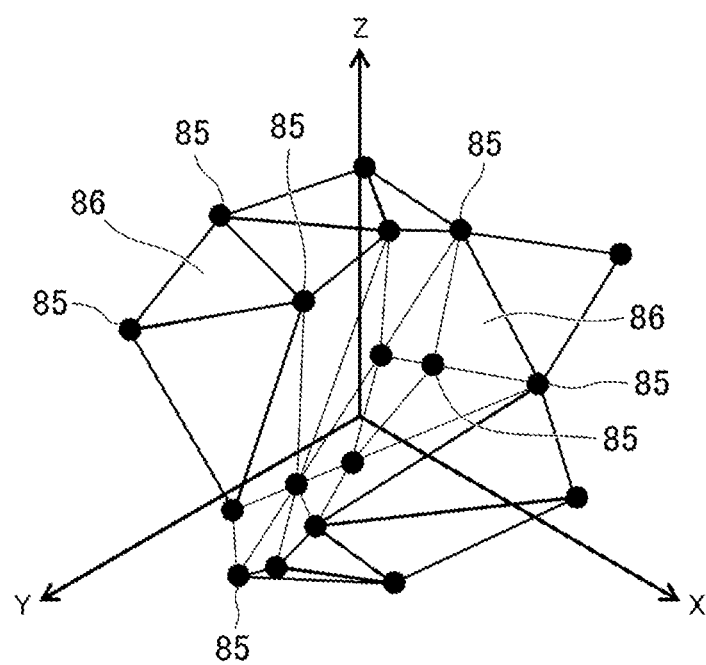
FIG. 16 is an explanatory diagram for describing a plurality of pieces of polygon data in the embodiment according to the present disclosure.

In the first processing step, the first processing unit 62a first creates a plurality of pieces of polygon data by using the measured three-dimensional coordinate data at a plurality of positions over the entire flange surface as illustrated in FIG. 16. The polygon data is data that defines a polygonal plane. The first processing unit 62a connects, among the plurality of points 85 indicated by the measured three-dimensional coordinate data at the plurality of positions, a plurality of points 85 adjacent to each other with line segments. A polygonal plane surrounded by these line segments is referred to as a polygon 86.

Figure 17:
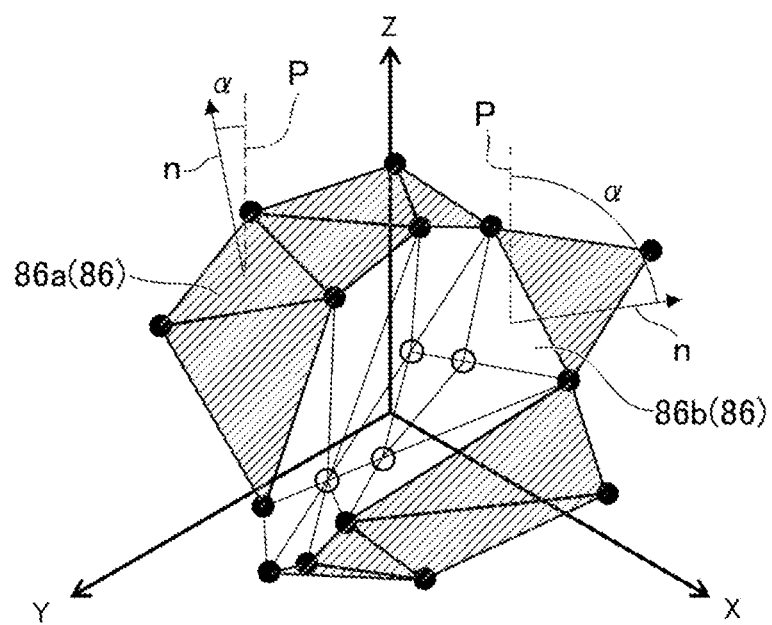
FIG. 17 is an explanatory diagram for describing extraction of a plurality of pieces of specific polygon data from the plurality of pieces of polygon data in the embodiment according to the present disclosure.

Subsequently, as illustrated in FIG. 17, the first processing unit 62a extracts, from among the plurality of pieces polygon data, a plurality of pieces of polygon data that satisfy a certain condition. Note that, in FIG. 17, polygons 86a identified by the polygon data to be extracted are patterned, and polygons 86b identified by the polygon data not to be extracted are not patterned. Further, an XY plane in FIG. 17 is a plane parallel to the flange surface 80 indicated by the reference three-dimensional shape data 58d. Here, the condition described above is that an inclination of the polygon 86 identified by the polygon data with respect to the flange surface 80 indicated by the reference three-dimensional shape data 58d is within a predetermined inclination. The first processing unit 62a first obtains a normal line n of the polygon 86 for each of the plurality of polygons 86. Subsequently, the first processing unit 62a obtains an angle α between a perpendicular line p to the flange surface 80 indicated by the reference three-dimensional shape data 58d and the normal line n of the polygon 86 for each of the plurality of polygons 86. Then, the first processing unit 62a extracts, from among the plurality of pieces of polygon data, a plurality of pieces of polygon data in which the angle α between the perpendicular line p to the flange surface 80 and the normal line n of the polygon 86 is within a predetermined angle (predetermined inclination).

Figure 18:
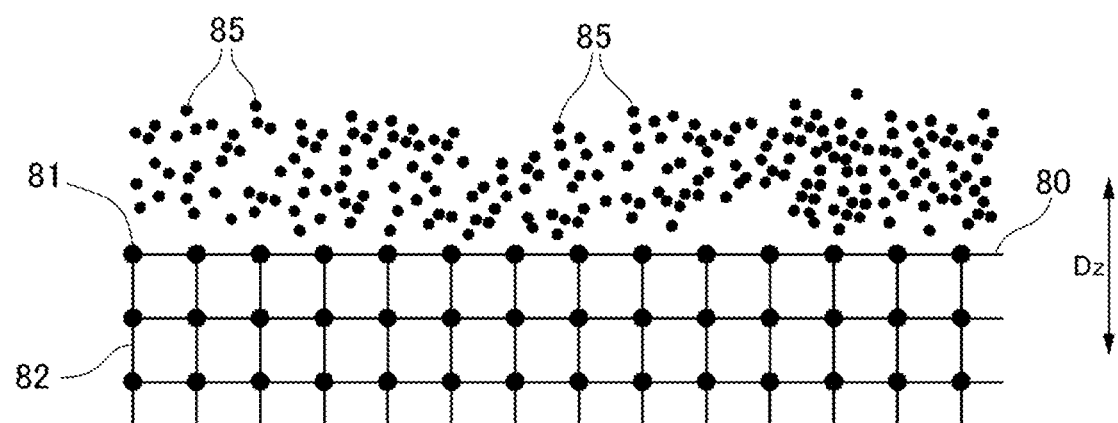
FIG. 18 is an image diagram illustrating a relative positional relationship between the flange surface indicated by the reference three-dimensional shape data and points indicated by measured three-dimensional coordinate data at a plurality of positions after the extraction of the polygon data out of the plurality of positions on the actual flange surface in the case of executing the third determining method in the embodiment according to the present disclosure.

This data extraction processing is performed to exclude, from the measured three-dimensional coordinate data at the plurality of points 85 received in the measured coordinate receiving step S1, measured three-dimensional coordinate data at points on a wall of an edge of the flange surface and points on the inside surfaces of the bolt holes 34 penetrating through the flange surface. Thus, as illustrated in FIG. 18, the number of the points 85 after the extraction processing is less than the number of the points 85 before the extraction processing. In particular, the number of the points 85 after the extraction processing is significantly less than the number of the points 85 before the extraction processing in regard to a surface 82 that is inclined with respect to the flange surface 80 in a reference shape model indicated by the reference three-dimensional shape data 58d.

Figure 19:
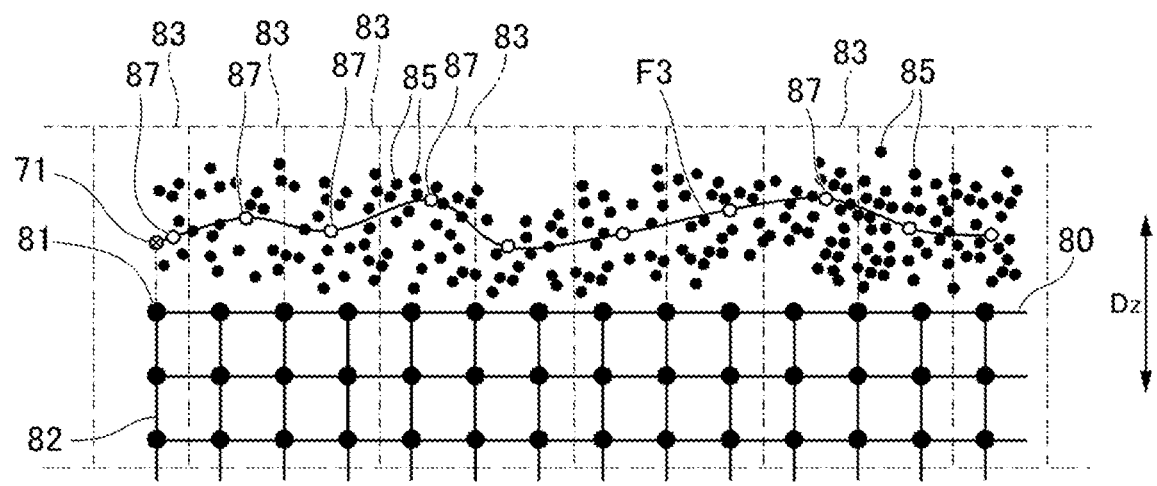
FIG. 19 is an explanatory diagram illustrating a method for obtaining a reference position in the first processing step in the case of executing the third determining method in the embodiment according to the present disclosure.

Next, as illustrated in FIG. 19, the first processing unit 62a divides a virtual three-dimensional space including the flange surface 80 into a plurality of three-dimensional blocks 83. Then, the first processing unit 62a sets a representative point 87 in a target three-dimensional block 83 for each of the plurality of three-dimensional blocks 83. Specifically, the first processing unit 62a selects, from among the plurality of points 85 included in the polygons 86a identified by the plurality of pieces of polygon data extracted in the extraction processing, a point that is a median of the plurality of points 85 included in the target three-dimensional block 83 as the representative point 87 in the target three-dimensional block 83.

The representative point 87 may be determined by robust estimation or bi-weight estimation based on the Lorentz distribution of the plurality of points 85 included in the polygons 86a identified by the plurality of pieces of polygon data extracted in the extraction processing.

The first processing unit 62a connects the respective representative points 87 of the plurality of three-dimensional blocks 83 to each other with a plane or a curved surface as a complementary surface to create surface shape data of the complementary surface including the respective representative points 87 of the plurality of three-dimensional blocks 83. The surface shape data is represented by a function F3 indicating the shape of the entire flange surface. The effective coordinate determining unit 62 obtains effective three-dimensional coordinate data at the reference positions 71 by using the surface shape data of the entire flange surface represented by the function F3.

Similar to the second processing steps in the first determining method and the second determining method, in the second processing step in the third determining method, the second processing unit 62b of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62b estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

The third determining method is less likely to be affected by a local shape change than the second determining method and can reduce the possibility of including a large measurement error. Further, in the third determining method, the effective three-dimensional coordinate data at the reference position can be determined even when there is a wide range of data deficiency due to an obstacle or the like.

In the above description, the coordinate values of the lower first position 72La and the lower second position 72Lb in the vertical direction Dz are estimated. However, when measured three-dimensional coordinate data at a plurality of positions over the entire upper surface 35ap of the first supported portion 35a and measured three-dimensional coordinate data at a plurality of positions over the entire upper surface 35bp of the second supported portion 35b are received in the measured coordinate receiving step S1, the effective three-dimensional coordinate data of the lower first position 72La and the lower second position 72Lb may be obtained by the following method.

Specifically, first, the surface shape data of the entirety of the upper surface 35ap of the first supported portion 35a, the upper surface 35bp of the second supported portion 35b, and the lower flange surface 33L including the measured three-dimensional coordinate data at the plurality of positions over the entire upper surface 35ap of the first supported portion 35a and at the plurality of positions over the entire upper surface 35bp of the second supported portion 35b are obtained. Then, the effective three-dimensional coordinate data of the lower first position 72La and the lower second position 72Lb are obtained by using the surface shape data of the entire surface represented by a function.

As described above, the upper-half casing 30U may also include a first supported portion and a second supported portion that are continuous with the upper flange 32U. In that case, measured three-dimensional coordinate data at a plurality of positions over the entire lower surface of the first supported portion that is continuous with the upper flange 32U and measured three-dimensional coordinate data at a plurality of positions over the entire lower surface of the second supported portion that is continuous with the upper flange 32U may be received in the measured coordinate receiving step S1, and then the effective three-dimensional coordinate data of the upper first position 72Ua and the upper second position 72Ub may be obtained by the following method.

Specifically, first, the surface shape data of the entirety of the lower surface of the first supported portion, the lower surface of second supported portion, and the upper flange surface 33U including the measured three-dimensional coordinate data at the plurality of positions over the entire lower surface of the first supported portion and at the plurality of positions over the entire lower surface of the second supported portion are obtained. Then, the effective three-dimensional coordinate data of the upper first position 72Ua and the upper second position 72Ub are obtained by using the surface shape data of the entire surface represented by a function.

Fourth Determining Method

Figure 20:
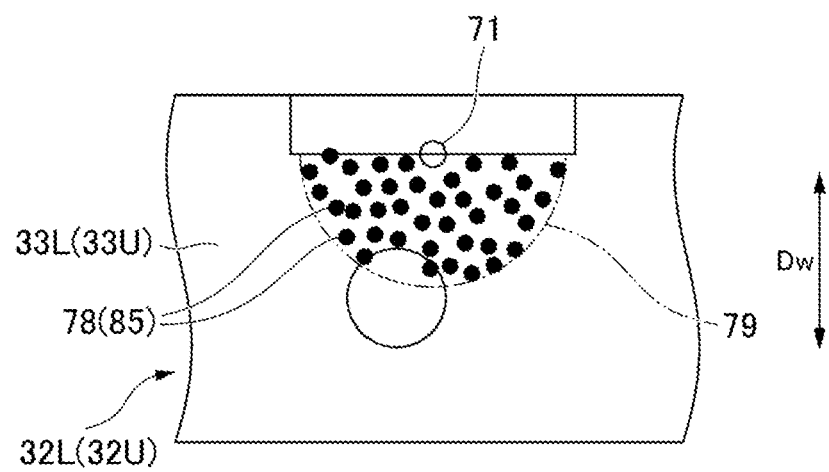
FIG. 20 is an explanatory diagram illustrating positions of measured three-dimensional coordinate data necessary for executing a fourth determining method in the embodiment according to the present disclosure.
Figure 21:
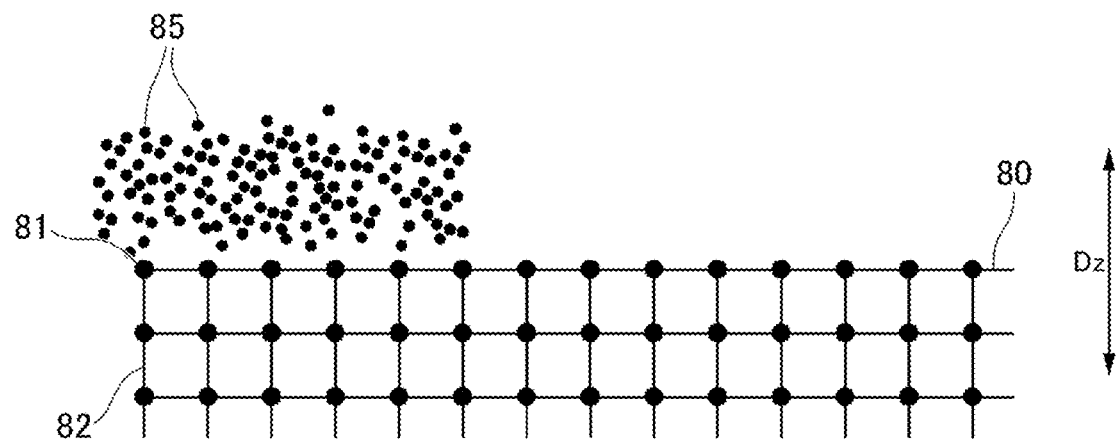
FIG. 21 is an image diagram illustrating a relative positional relationship between the flange surface indicated by the reference three-dimensional shape data and points indicated by measured three-dimensional coordinate data at the plurality of positions on the actual flange surface in the case of executing a fourth determining method in the embodiment according to the present disclosure.

When the fourth determining method is performed in the effective coordinate determining step S2, measured three-dimensional coordinate data at a plurality of positions 78 in a reference measurement region 79 including the above-described reference position 71 on the flange surface are received in the measured coordinate receiving step S1 as illustrated in FIGS. 20 and 21. Note that FIG. 21 is an image diagram illustrating the relative positional relationship between the flange surface 80 indicated by the reference three-dimensional shape data 58d and points 85 indicated by the measured three-dimensional coordinate data at the plurality of positions in the reference measurement region 79 on the actual flange surface. Here, as illustrated in FIG. 20, the reference measurement region 79 is, for example, a region within a distance range of ½₀ to ½ of the flange width at the reference position 71 with the reference position 71 as a starting point. Thus, the reference measurement region 79 is also a lower measurement region including the lower target position 71L on the lower flange surface 33L, and is also an upper measurement region including the upper target position 71U on the upper flange surface 33U. Here, the three-dimensional coordinate data at the reference position 71 is the three-dimensional coordinate data at the reference position indicated by the reference three-dimensional shape data 58d. The number of pieces of the measured three-dimensional coordinate data in the reference measurement region 79 received in the measured coordinate receiving step S1 is, for example, 10 or more. Thus, the number of pieces of the measured three-dimensional coordinate data in the reference measurement region 79 received in the measured coordinate receiving step S1 of the fourth determining method is larger than the number of pieces of the measured three-dimensional coordinate data on the positions on the virtual line received in the measured coordinate receiving step S1 of the second determining method.

Similar to the first processing steps in the determining methods described above, also in the first processing step in the fourth determining method, the first processing unit 62a of the effective coordinate determining unit 62 determines the effective three-dimensional coordinate data at the plurality of lower target positions 71L, the lower edge first position 73La, the lower edge second position 73Lb, the plurality of upper target positions 71U, the upper edge first position 73Ua, and the upper edge second position 73Ub. That is, the first processing unit 62a determines the effective three-dimensional coordinate data at all the reference positions 71 described above.

Figure 22:
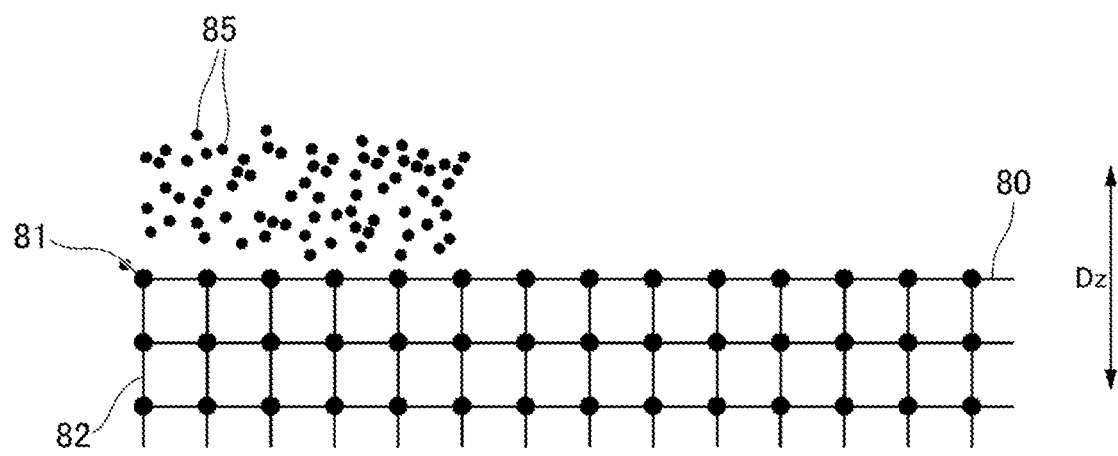
FIG. 22 is an image diagram illustrating a relative positional relationship between the flange surface indicated by the reference three-dimensional shape data and points indicated by measured three-dimensional coordinate data at a plurality of positions after the extraction of the polygon data out of the plurality of positions on the actual flange surface in the case of executing the fourth determining method in the embodiment according to the present disclosure.

In this first processing step, similar to the first processing step in the third determining method, the first processing unit 62a first creates a plurality of pieces of polygon data using the measured three-dimensional coordinate data at the plurality of positions 78, and extracts, from among the plurality of pieces of polygon data, a plurality of pieces of polygon data that satisfy a certain condition. As a result, as illustrated in FIG. 22, the number of the points 85 indicated by the measured three-dimensional coordinate data after the extraction processing is less than the number of the points 85 before the extraction processing.

Figure 23:
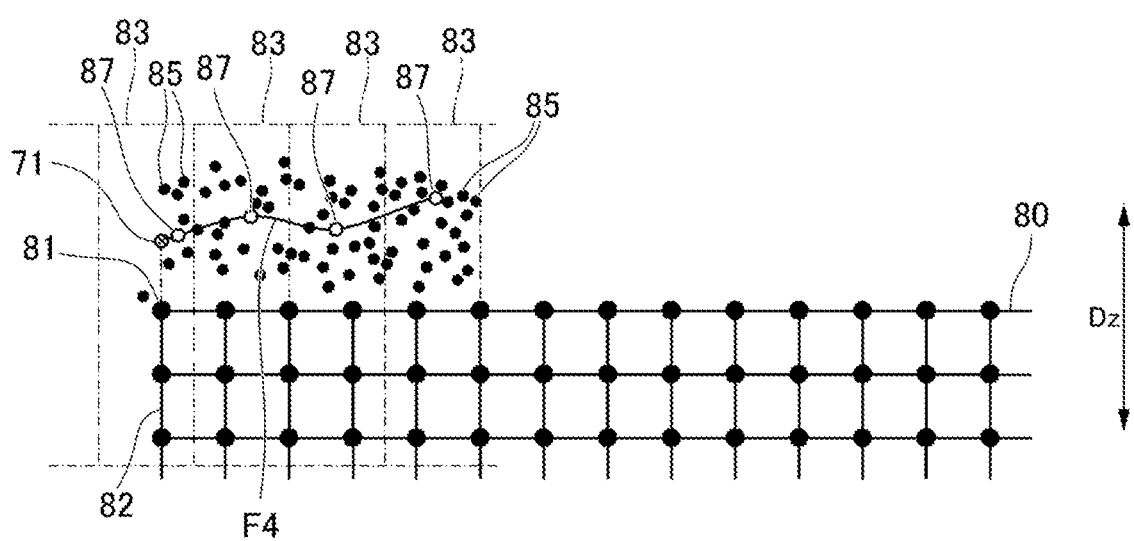
FIG. 23 is an explanatory diagram illustrating a method for obtaining a reference position in the first processing step in the case of executing the fourth determining method in the embodiment according to the present disclosure.

Next, similar to the first processing step in the third determining method, the first processing unit 62a divides a virtual three-dimensional space including the flange surface 80 into a plurality of three-dimensional blocks 83 as illustrated in FIG. 23. Then, the first processing unit 62a determines a representative point 87 in a target three-dimensional block 83 for each of the plurality of three-dimensional blocks 83.

The first processing unit 62a connects the respective representative points 87 of the plurality of three-dimensional blocks 83 to each other with a plane or a curved surface as a complementary surface to create the surface shape data of the complementary surface including the respective representative points 87 of the plurality of three-dimensional blocks 83. The surface shape data is represented by a function F4 indicating the shape of the flange surface in the reference measurement region 79. The first processing unit 62a obtains effective three-dimensional coordinate data at the reference position 71 by using the surface shape data represented by the function F4.

Similar to the second processing steps in the first determining method and the second determining method, in the second processing step in the fourth determining method, the second processing unit 62b of the effective coordinate determining unit 62 estimates effective three-dimensional coordinate data at the lower first position 72La and the lower second position 72Lb by using the effective three-dimensional coordinate data at the plurality of lower target positions 71L, the lower edge first position 73La, and the lower edge second position 73Lb. Further, the second processing unit 62b estimates effective three-dimensional coordinate data at the upper first position 72Ua and the upper second position 72Ub by using the effective three-dimensional coordinate data at the plurality of upper target positions 71U, the upper edge first position 73Ua, and the upper edge second position 73Ub.

In this manner, the effective three-dimensional coordinate data at the lower first position 72La, the lower second position 72Lb, the plurality of lower target positions 71L, the upper first position 72Ua, the upper second position 72Ub, and the plurality of upper target positions 71U are determined.

The fourth determining method is less likely to be affected by a local shape change than the second determining method and can reduce the possibility of including a large measurement error. Further, in the fourth determining method, effective three-dimensional coordinate data at the reference position can be determined even when there is a wide range of data deficiency due to an obstacle or the like.

In the above description, the effective three-dimensional coordinate data at the reference position 71 is obtained by using the surface shape data of the flange surface in the reference measurement region 79. However, instead of creating the surface shape data, a coordinate value in the vertical direction Dz at the representative point 87 of the three-dimensional block 83 including the reference position 71, from among the plurality of three-dimensional blocks, may be set as the coordinate value in the vertical direction Dz at the reference position 71.

In the above description, the coordinate values of the lower first position 72La and the lower second position 72Lb in the vertical direction Dz are estimated. However, when measured three-dimensional coordinate data at a plurality of positions over the entire upper surface 35ap of the first supported portion 35a and measured three-dimensional coordinate data at a plurality of positions over the entire upper surface 35bp of the second supported portion 35b are received in the measured coordinate receiving step S1, the effective three-dimensional coordinate data of the lower first position 72La and the lower second position 72Lb may be obtained by the following method. Specifically, first, a plurality of pieces of polygon data are created by using the measured three-dimensional coordinate data at the plurality of positions over the entire upper surface 35ap of the first supported portion 35a, and, from among the plurality of pieces of polygon data, a plurality of pieces of polygon data that satisfy a certain condition are extracted. Then, a representative point is determined from among a plurality of points indicated by the extracted polygon data, and a coordinate value at the representative point in the vertical direction Dz is used as the coordinate value of the lower first position 72La in the vertical direction Dz. Similarly, measured three-dimensional coordinate data at a plurality of positions over the entire upper surface 35ap of the second supported portion 35b are used to determine a representative point, and a coordinate value at the representative point in the vertical direction Dz is used as the coordinate value of the lower second position 72Lb in the vertical direction Dz.

As described above, the upper-half casing 30U may also include a first supported portion and a second supported portion that are continuous with the upper flange 32U. In that case, measured three-dimensional coordinate data at a plurality of positions over the entire lower surface of the first supported portion that is continuous with the upper flange 32U and measured three-dimensional coordinate data at a plurality of positions over the entire lower surface of the second supported portion 35b that is continuous with the upper flange 32U are received in the measured coordinate receiving step S1. Similar to the above, representative points on the respective surfaces are determined by using the measured three-dimensional coordinate data at the plurality of positions, and the coordinate values in the vertical direction Dz at the representative points on the respective surfaces are used as the coordinate value at the upper first position 72Ua in the vertical direction Dz and the coordinate value at the upper second position 72Ub in the vertical direction Dz.

As described above, in the present embodiment, the displacement amounts of the upper target position 71U and the lower target position 71L in the vertical direction Dz when the casing 30 changes from the open state to the fastened state are calculated in accordance with the difference between the position on the upper flange surface 33U in the vertical direction Dz of the upper target position 71U from which a displacement amount in the vertical direction Dz is to be obtained and the position on the lower flange surface 33L in the vertical direction Dz of the lower target position 71L from which a displacement amount in the vertical direction Dz is to be obtained. Accordingly, in the present embodiment, the displacement amounts of the upper target position 71U and the lower target position 71L in the vertical direction Dz can be obtained without simulating the deformation of the lower-half casing 30L and the upper-half casing 30U using the finite element models of the lower-half casing 30L and the upper-half casing 30U. Therefore, the present embodiment can reduce the calculation load for calculating the displacement amounts. As a result, the present embodiment can reduce a preparation period and costs for the estimation of the flange surfaces.

As above, the embodiments of the present disclosure have been described in detail. However, the present disclosure is not limited by the embodiments described above. Various additions, changes, substitutions, partial deletions, and the like can be made without departing from the scope and the spirit of the present invention derived from the contents and equivalents thereof defined in the claims.

SUPPLEMENTARY NOTES

The method for estimating a flange displacement amount in a rotary machine according to the embodiments described above can be understood, for example, as follows.

(1) A method for estimating a flange displacement amount in a rotary machine according to a first aspect is applied to a rotary machine below.

The rotary machine includes a rotor 15 rotatable around an axis Ar extending in a horizontal direction, a casing 30 covering an outer periphery of the rotor 15, a stationary component disposed in the casing 30 and attached to the casing 30, and a base frame 11 supporting the casing 30 from below. The casing 30 includes an upper-half casing 30U on an upper side, a lower-half casing 30L on a lower side, and a plurality of bolts 39 fastening the upper-half casing 30U to the lower-half casing 30L. The upper-half casing 30U includes an upper flange 32U formed with an upper flange surface 33U facing downward. The lower-half casing 30L includes a lower flange 32L formed with a lower flange surface 33L facing upward and opposing the upper flange surface 33U in a vertical direction Dz, and a first supported portion 35a and a second supported portion 35b that are continuous with the lower flange 32L, supported by the base frame 11 from below, and separated from each other in an axial direction Dy in which the axis Ar extends. The upper flange 32U and the lower flange 32L include bolt holes 34 penetrating therethrough in the vertical direction Dz, and the respective plurality of bolts 39 can be inserted into the bolt holes 34.

The method for estimating a flange displacement amount in a rotary machine above performs:

a measured coordinate receiving step S1 of receiving measured three-dimensional coordinate data at a plurality of positions on the upper flange surface 33U and measured three-dimensional coordinate data at a plurality of positions on the lower flange surface 33L, the measured three-dimensional data being measured in an open state where the upper-half casing 30U is not fastened to the lower-half casing 30L by the plurality of bolts 39 after the rotary machine is disassembled;

an effective coordinate determining step S2 of determining effective three-dimensional coordinate data at a lower first position 72La, a lower second position 72Lb, and a lower target position 71L by using the measured three-dimensional coordinate data at the plurality of positions on the lower flange surface 33L, the lower first position 72La being coincident with a first representative position 74a of the first supported portion 35a in the horizontal direction on a surface continuous with the lower flange surface 33L, the lower second position 72Lb being coincident with a second representative position 74b of the second supported portion 35b in the horizontal direction on a surface continuous with the lower flange surface 33L, and the lower target position 71L being a point on the lower flange surface 33L from which a displacement amount in the vertical direction Dz when a state changes from the open state to a fastened state where the upper-half casing 30U is fastened to the lower-half casing 30L by the plurality of bolts 39 is to be obtained and determining effective three-dimensional coordinate data at an upper first position 72Ua, an upper second position 72Ub, and an upper target position 71U by using the measured three-dimensional coordinate data at the plurality of positions on the upper flange surface 33U, the upper first position 72Ua being coincident with the first representative position 74a of the first supported portion 35a in the horizontal direction on a surface continuous with the upper flange surface 33U, the upper second position 72Ub being coincident with the second representative position 74b of the second supported portion 35b in the horizontal direction on a surface continuous with the upper flange surface 33U, and the upper target position 71U being coincident with the lower target position 71L in the horizontal direction on the upper flange surface 33U;

a coordinate change step S3 of changing the effective three-dimensional coordinate data determined in the effective coordinate determining step S2 such that the effective three-dimensional coordinate data at the lower first position 72La and the effective three-dimensional coordinate data at the upper first position 72Ua determined in the effective coordinate determining step S2 are coincident with each other and that the effective three-dimensional coordinate data at the lower second position 72Lb and the effective three-dimensional coordinate data at the upper second position 72Ub determined in the effective coordinate determining step S2 are coincident with each other;

a displacement amount calculation step S4 of calculating a displacement amount of the upper target position 71U and a displacement amount of the lower target position 71L in the vertical direction Dz when a state changes from the open state to the fastened state in accordance with a difference between a position in the vertical direction Dz indicated by the effective three-dimensional coordinate data at the upper target position 71U after the coordinate change step S3 and a position in the vertical direction Dz indicated by the effective three-dimensional coordinate data at the lower target position 71L after the coordinate change step S3.

The present aspect calculates the displacement amounts of the upper target position 71U and the lower target position 71L in the vertical direction Dz when the casing 30 changes from the open state to the fastened state in accordance with the difference between the position on the upper flange surface 33 in the vertical direction Dz of the upper target position 71U from which a displacement amount in the vertical direction Dz when the casing 30 changes from the open state to the fastened state is to be obtained and the position on the lower flange surface 33L in the vertical direction Dz of the lower target position 71L from which a displacement amount in the vertical direction Dz when the casing 30 changes from the open state to the fastened state is to be obtained. Accordingly, the present aspect can calculate the displacement amounts of the upper target position 71U and the lower target position 71L in the vertical direction Dz without simulating the deformation of the lower-half casing 30L and the upper-half casing 30U using the finite element models of the lower-half casing 30L and the upper-half casing 30U. Therefore, the present aspect can reduce the calculation load for calculating the displacement amounts.

(2) A method for estimating a flange displacement amount in a rotary machine according to a second aspect is the method for estimating a flange displacement amount in a rotary machine according to the first aspect, wherein, in the displacement amount calculation step S4, one-half of the difference is used as the displacement amount of the upper target position 71U and the displacement amount of the lower target position 71L.

(3) A method for estimating a flange displacement amount in a rotary machine according to a third aspect is the method for estimating a flange displacement amount in a rotary machine according to the first aspect or the second aspect, wherein the lower target position 71L is a point at which the stationary component is disposed in the axial direction Dy and is a position at an inner side edge on the lower flange surface 33L.

From the viewpoint of performance and the like of the rotary machine, gaps in the radial direction Dr between the stationary components and the rotor 15 needs to be controlled. The present inventors have found that changes in the gaps in the radial direction Dr between the stationary components and the rotor 15 due to the deformation of the lower-half casing 30L and the upper-half casing 30U by changing the casing 30 from the open state to the fastened state are dominant over the deformation in the positions on the lower flange surface 33L at which the stationary component storage portions 36 are formed in the axial direction Dy and which are located at the inner side edges of the lower flange surface 33L and the deformation in the positions on the upper flange surface 33U at which the stationary component storage portions 36 are formed in the axial direction Dy and which are located at the inner side edges on the upper flange surface 33U. Accordingly, the present aspect can control the gaps in the radial direction Dr between the stationary components and the rotor 15 by changing the casing 30 from the open state to the fastened state with high accuracy.

(4) A method for estimating a flange displacement amount in a rotary machine according to a fourth aspect is the method for estimating a flange displacement amount in a rotary machine according to any one of the first to the third aspects, wherein, in the measured coordinate receiving step S1, measured three-dimensional coordinate data of the lower first position 72La and the lower second position 72Lb are received. In the effective coordinate determining step S2, the measured three-dimensional coordinate data at the lower first position 72La and the lower second position 72Lb acquired in the measured coordinate receiving step S1 are determined to be effective three-dimensional coordinate data of the lower first position 72La and the lower second position 72Lb as is.

In the present aspect, the measured three-dimensional coordinate data of the lower first position 72La and the lower second position 72Lb acquired in the measured coordinate receiving step S1 are determined to be the effective three-dimensional coordinate data at the lower first position 72La and the lower second position 72Lb as is, allowing the calculation load to be reduced.

(5) A method for estimating a flange displacement amount in a rotary machine according to a fifth aspect is the method for estimating a flange displacement amount in a rotary machine according to any one of the first to the third aspects, wherein, in the measured coordinate receiving step S1, measured three-dimensional coordinate data at a plurality of positions on an upper surface 35ap of the first supported portion 35a and measured three-dimensional coordinate data at a plurality of positions on an upper surface 35bp of the second supported portion 35b are received. In the effective coordinate determining step S2, the effective three-dimensional coordinate data of the lower first position 72La is obtained from the measured three-dimensional coordinate data at the plurality of positions on the upper surface 35ap of the first supported portion 35a acquired in the measured coordinate receiving step S1, and the effective three-dimensional coordinate data at the lower second position 72Lb is obtained from the measured three-dimensional coordinate data at the plurality of positions on the upper surface 35bp of the second supported portion 35b acquired in the measured coordinate receiving step S1.

In the present aspect, the effective three-dimensional coordinate data of the lower first position 72La is obtained from a plurality of pieces of the measured three-dimensional coordinate data on the upper surface 35ap of the first supported portion 35a acquired in the measured coordinate receiving step S1, and the effective three-dimensional coordinate data of the lower second position 72Lb is obtained from a plurality of pieces of the measured three-dimensional coordinate data on the upper surface 35bp of the second supported portion 35b acquired in the measured coordinate receiving step S1. Thus, in the present aspect, the effective three-dimensional coordinate data at the lower first position 72La and the lower second position 72Lb are less likely to be affected by a local shape change, and the possibility of including a large measurement error can be reduced.

(6) A method for estimating a flange displacement amount in a rotary machine according to a sixth aspect is the method for estimating a flange displacement amount in a rotary machine according to any one of the first to the fifth aspects, wherein, in the measured coordinate receiving step S1, measured three-dimensional coordinate data of the lower target position 71L and the upper target position 71U are received. In the effective coordinate determining step S2, the measured three-dimensional coordinate data of the lower target position 71L is determined to be effective three-dimensional coordinate data of the lower target position 71L as is, and the measured three-dimensional coordinate data of the upper target position 71U acquired in the measured coordinate receiving step S1 is determined to be effective three-dimensional coordinate data of the upper target position 71U as is.

In the present aspect, the measured three-dimensional coordinate data of the lower target position 71L and the upper target position 71U acquired in the measured coordinate receiving step S1 are determined to be the effective three-dimensional coordinate data of the lower target position 71L and the upper target position 71U as is, allowing the calculation load can be reduced.

(7) A method for estimating a flange displacement amount in a rotary machine according to a seventh aspect is the method for estimating a flange displacement amount in a rotary machine according to any one of the first to the fifth aspects, wherein, in the measured coordinate receiving step S1, measured three-dimensional coordinate data at a plurality of positions on a lower virtual line 76L passing through the lower target position 71L and extending in a flange width direction are received, and measured three-dimensional coordinate data at a plurality of positions on an upper virtual line 76U passing through the upper target position 71U and extending in the flange width direction are received. In the effective coordinate determining step S2, the effective three-dimensional coordinate data of the lower target position 71L is obtained from the measured three-dimensional coordinate data at the plurality of positions on the lower virtual line 76L, and the effective three-dimensional coordinate data of the upper target position 71U is obtained from the measured three-dimensional coordinate data at the plurality of positions on the upper virtual line 76U.

In the present aspect, the effective three-dimensional coordinate data of the lower target position 71L is obtained from the measured three-dimensional coordinate data at the plurality of positions on the lower virtual line 76L, and the effective three-dimensional coordinate data of the upper target position 71U is obtained from the measured three-dimensional coordinate data at the plurality of positions on the upper virtual line 76U. Thus, in the present aspect, the effective three-dimensional coordinate data at the lower target position 71L and the upper target position 71U are less likely to be affected by a local shape change, and the possibility of including a large measurement error can be reduced.

(8) A method for estimating a flange displacement amount in a rotary machine according to an eighth aspect is the method for estimating a flange displacement amount in a rotary machine according to any one of the first to the fifth aspects, wherein, in the measured coordinate receiving step S1, measured three-dimensional coordinate data at a plurality of positions in a lower measurement region including the lower target position 71L on the lower flange surface 33L are received, and measured three-dimensional coordinate data at a plurality of positions in an upper measurement region including the upper target position 71U on the upper flange surface 33U are received. In the effective coordinate determining step S2, the effective three-dimensional coordinate data of the lower target position 71L is obtained by using the measured three-dimensional coordinate data at the plurality of positions in the lower measurement region received in the measured coordinate receiving step S1, and the effective three-dimensional coordinate data of the upper target position 71U is obtained by using the measured three-dimensional coordinate data at the plurality of positions in the upper measurement region received in the measured coordinate receiving step S1.

In the present aspect, the effective three-dimensional coordinate data of the lower target position 71L is obtained from the measured three-dimensional coordinate data at the plurality of positions in the lower measurement region, and the effective three-dimensional coordinate data of the upper target position 71U is obtained from the measured three-dimensional coordinate data at the plurality of positions in the upper measurement region. Thus, in the present aspect, the effective three-dimensional coordinate data at the lower target position 71L and the upper target position 71U are less likely to be affected by a local shape change, and the possibility of including a large measurement error can be reduced.

(9) A method for estimating a flange displacement amount in a rotary machine according to a ninth aspect is the method for estimating a flange displacement amount in a rotary machine according to any one of the first to the fifth aspects, wherein, in the measured coordinate receiving step S1, measured three-dimensional coordinate data at a plurality of positions over an entirety of the lower flange surface 33L are received and measured three-dimensional coordinate data at a plurality of positions over an entirety of the upper flange surface 33U are received. In the effective coordinate determining step S2, shape data of the lower flange surface 33L indicating three-dimensional shape of the entire lower flange surface 33L is obtained by using the measured three-dimensional coordinate data at the plurality of positions over the entire lower flange surface 33L received in the measured coordinate receiving step S1, and shape data of the upper flange surface 33U indicating three-dimensional shape of the entire upper flange surface 33U is obtained by using the measured three-dimensional coordinate data at the plurality of positions over the entire upper flange surface 33U received in the measured coordinate receiving step S1. Further, the effective three-dimensional coordinate data of the lower target position 71L is obtained by using the shape data of the lower flange surface 33L, and the effective three-dimensional coordinate data of the upper target position 71U is obtained by using the shape data of the upper flange surface 33U.

In the present aspect, the effective three-dimensional coordinate data of the lower target position 71L is obtained from the measured three-dimensional coordinate data at the plurality of positions over the entire lower flange surface 33L, and the effective three-dimensional coordinate data of the upper target position 71U is obtained from the measured three-dimensional coordinate data at the plurality of positions over the entire upper flange surface 33U. Thus, in the present aspect, the effective three-dimensional coordinate data at the lower target position 71L and the upper target position 71U are less likely to be affected by a local shape change, and the possibility of including a large measurement error can be reduced. Further, in the present aspect, the effective three-dimensional coordinate data at the lower target position 71L and the upper target position 71U can be determined even when there is a wide range of data deficiency due to an obstacle or the like.

The program for estimating a flange displacement amount in a rotary machine according to the embodiments described above can be understood, for example, as follows.

(10) A program for estimating a flange displacement amount in a rotary machine according to a tenth aspect is applied to a rotary machine below.

The rotary machine includes a rotor 15 rotatable around an axis Ar extending in a horizontal direction, a casing 30 covering an outer periphery of the rotor 15, a stationary component disposed in the casing 30 and attached to the casing 30, and a base frame 11 supporting the casing 30 from below. The casing 30 includes an upper-half casing 30U on an upper side, a lower-half casing 30L on a lower side, and a plurality of bolts 39 fastening the upper-half casing 30U to the lower-half casing 30L. The upper-half casing 30U includes an upper flange 32U formed with an upper flange surface 33U facing downward. The lower-half casing 30L includes a lower flange 32L formed with a lower flange surface 33L facing upward and opposing the upper flange surface 33U in a vertical direction Dz, and a first supported portion 35a and a second supported portion 35b that are continuous with the lower flange 32L, supported by the base frame 11 from below, and separated from each other in an axial direction Dy in which the axis Ar extends. The upper flange 32U and the lower flange 32L include bolt holes 34 penetrating therethrough in the vertical direction Dz, and the respective plurality of bolts 39 can be inserted into the bolt holes 34.

The program for estimating a flange displacement amount in a rotary machine above causes a computer to execute:

a measured coordinate receiving step S1 of receiving measured three-dimensional coordinate data at a plurality of positions on the upper flange surface 33U and measured three-dimensional coordinate data at a plurality of positions on the lower flange surface 33L, the measured three-dimensional data being measured in an open state where the upper-half casing 30U is not fastened to the lower-half casing 30L by the plurality of bolts 39 after the rotary machine is disassembled;

an effective coordinate determining step S2 of determining effective three-dimensional coordinate data at a lower first position 72La, a lower second position 72Lb, and a lower target position 71L by using the measured three-dimensional coordinate data at the plurality of positions on the lower flange surface 33L, the lower first position 72La being coincident with a first representative position 74a of the first supported portion 35a in the horizontal direction on a surface continuous with the lower flange surface 33L, the lower second position 72Lb being coincident with a second representative position 74b of the second supported portion 35b in the horizontal direction on a surface continuous with the lower flange surface 33L, and the lower target position 71L being a point on the lower flange surface 33L from which a displacement amount in a vertical direction Dz when a state changes from the open state to a fastened state where the upper-half casing 30U is fastened to the lower-half casing 30L by the plurality of bolts 39 is to be obtained and determining effective three-dimensional coordinate data at an upper first position 72Ua, an upper second position 72Ub, and an upper target position 71U by using the measured three-dimensional coordinate data at the plurality of positions on the upper flange surface 33U, the upper first position 72Ua being coincident with the first representative position 74a of the first supported portion 35a in the horizontal direction on a surface continuous with the upper flange surface 33U, the upper second position 72Ub being coincident with the second representative position 74b of the second supported portion 35b in the horizontal direction on a surface continuous with the upper flange surface 33U, and the upper target position 71U being coincident with the lower target position 71L in the horizontal direction on the upper flange surface 33U;

a coordinate change step S3 of changing the effective three-dimensional coordinate data determined in the effective coordinate determining step S2 such that the effective three-dimensional coordinate data at the lower first position 72La and the effective three-dimensional coordinate data at the upper first position 72Ua determined in the effective coordinate determining step S2 are coincident with each other and that the effective three-dimensional coordinate data at the lower second position 72Lb and the effective three-dimensional coordinate data at the upper second position 72Ub determined in the effective coordinate determining step S2 are coincident with each other;

a displacement amount calculation step S4 of calculating a displacement amount of the upper target position 71U in the vertical direction Dz and a displacement amount of the lower target position 71L in the vertical direction Dz when a state changes from the open state to the fastened state in accordance with a difference between a position in the vertical direction Dz indicated by the effective three-dimensional coordinate data at the upper target position 71U after the coordinate change step S3 and a position in the vertical direction Dz indicated by the effective three-dimensional coordinate data at the lower target position 71L after the coordinate change step S3.

In the present aspect, causing the computer to execute the program can reduce the calculation load for calculating the displacement amounts similar to the first aspect.

(11) A program for estimating a flange displacement amount in a rotary machine according to an eleventh aspect is the program for estimating a flange displacement amount in a rotary machine according to the tenth aspect, wherein, in the displacement amount calculation step S4, one-half of the difference is used as the displacement amount of the upper target position 71U and the displacement amount of the lower target position 71L.

The device for estimating a flange displacement amount in a rotary machine according to the embodiments described above can be understood, for example, as follows.

(12) A device for estimating a flange displacement amount in a rotary machine according to a twelfth aspect is applied to a rotary machine below.

The rotary machine includes a rotor 15 rotatable around an axis Ar extending in a horizontal direction, a casing 30 covering an outer periphery of the rotor 15, a stationary component disposed in the casing 30 and attached to the casing 30, and a base frame 11 supporting the casing 30 from below. The casing 30 includes an upper-half casing 30U on an upper side, a lower-half casing 30L on a lower side, and a plurality of bolts 39 fastening the upper-half casing 30U to the lower-half casing 30L. The upper-half casing 30U includes an upper flange 32U formed with an upper flange surface 33U facing downward. The lower-half casing 30L includes a lower flange 32L formed with a lower flange surface 33L facing upward and opposing the upper flange surface 33U in a vertical direction Dz and a first supported portion 35a and a second supported portion 35b that are continuous with the lower flange 32L, supported by the base frame 11 from below, and separated from each other in an axial direction Dy in which the axis Ar extends. The upper flange 32U and the lower flange 32L include bolt holes 34 penetrating therethrough in the vertical direction Dz, and the respective plurality of bolts 39 can be inserted into the bolt holes 34.

A device for estimating a flange displacement amount 50 in a rotary machine above includes:

a measured coordinate receiving unit 61 configured to receive measured three-dimensional coordinate data at a plurality of positions on the upper flange surface 33U and measured three-dimensional coordinate data at a plurality of positions on the lower flange surface 33L, the measured three-dimensional data being measured in an open state where the upper-half casing 30U is not fastened to the lower-half casing 30L by the plurality of bolts 39 after the rotary machine is disassembled;

an effective coordinate determining unit 62 configured to determine effective three-dimensional coordinate data at a lower first position 72La, a lower second position 72Lb, and a lower target position 71L by using the measured three-dimensional coordinate data at the plurality of positions on the lower flange surface 33L, the lower first position 72La being coincident with a first representative position 74a of the first supported portion 35a in the horizontal direction on a surface continuous with the lower flange surface 33L, the lower second position 72Lb being coincident with a second representative position 74b of the second supported portion 35b in the horizontal direction on a surface continuous with the lower flange surface 33L, and the lower target position 71L being a point on the lower flange surface 33L at which a displacement amount in a vertical direction Dz when a state changes from the open state to a fastened state where the upper-half casing 30U is fastened to the lower-half casing 30L by the plurality of bolts 39 is to be obtained and determine effective three-dimensional coordinate data at an upper first position 72Ua, an upper second position 72Ub, and an upper target position 71U by using the measured three-dimensional coordinate data at the plurality of positions on the upper flange surface 33U, the upper first position 72Ua being coincident with the first representative position 74a of the first supported portion 35a in the horizontal direction on a surface continuous with the upper flange surface 33U, the upper second position 72Ub being coincident with the second representative position 74b of the second supported portion 35b in the horizontal direction on a surface continuous with the upper flange surface 33U, and the upper target position 71U being coincident with the lower target position 71L in the horizontal direction on the upper flange surface 33U;

a coordinate change unit 63 configured to change the effective three-dimensional coordinate data determined by the effective coordinate determining unit 62 such that the effective three-dimensional coordinate data at the lower first position 72La and the effective three-dimensional coordinate data at the upper first position 72Ua determined by the effective coordinate determining unit 62 are coincident with each other and that the effective three-dimensional coordinate data at the lower second position 72Lb and the effective three-dimensional coordinate data at the upper second position 72Ub determined by the effective coordinate determining unit 62 are coincident with each other;

a displacement amount calculation unit 64 configured to calculate a displacement amount of the upper target position 71U in the vertical direction Dz and a displacement amount of the lower target position 71L in the vertical direction Dz when a state changes from the open state to the fastened state in accordance with a difference between a position in the vertical direction Dz indicated by the effective three-dimensional coordinate data at the upper target position 71U after change of a coordinate and a position in the vertical direction Dz indicated by the effective three-dimensional coordinate data at the lower target position 71L after a coordinate change.

The present aspect can reduce the calculation load for calculating the displacement amounts similar to the first aspect.

(13) A device for estimating a flange displacement amount in a rotary machine according to a thirteenth is the device for estimating a flange displacement amount 50 in a rotary machine according to the twelfth aspect, wherein, the displacement amount calculation unit 64 uses one-half of the difference as the displacement amount of the upper target position 71U and the displacement amount of the lower target position 71L.

INDUSTRIAL APPLICABILITY

One aspect of the present disclosure reduces the calculation load for estimating the displacement amounts of the flange surfaces of the upper-half casing and the lower-half casing, allowing a preparation period and costs for the estimation of the flange surfaces to be reduced.

REFERENCE SIGNS LIST

10: Steam turbine (rotary machine)
11: Base frame
12a: First shaft bearing device
12b: Second shaft bearing device
13a: First shaft sealing device (stationary component)
13b: Second shaft sealing device (stationary component)
15: Rotor
16: Rotor shaft
17: Rotor blade row
20: Diaphragm (stationary component)
20L: Lower-half diaphragm
20U: Upper-half diaphragm
22: Stator vane
23: Diaphragm inner ring
24: Diaphragm outer ring
25: Sealing device
30: Casing
30L: Lower-half casing
30U: Upper-half casing
31L: Lower-half casing main body
31U: Upper-half casing main body
32L: Lower flange
32U: Upper flange
33L: Lower flange surface
33U: Upper flange surface
34: Bolt hole
35a: First supported portion
35ap: Upper surface
35b: Second supported portion
35bp: Upper surface
36: Stationary component storage portion
39: Bolt
50: Device for estimating flange displacement amount
51: Manual input device
52: Display device
53: Input/output interface
54: Device interface
55: Communication interface
56: Storage and reproduction device
57: Memory
58: Auxiliary storage device
58d: Reference three-dimensional shape data
58p: Program for estimating flange displacement amount
60: CPU
61: Measured coordinate receiving unit
62: Effective coordinate determining unit
62a: First processing unit
62b: Second processing unit
63: Coordinate change unit
64: Displacement amount calculation unit
69: Three-dimensional shape measuring device
71: Reference position
71L: Lower target position
71U: Upper target position
72La: Lower first position
72Ua: Upper first position
72Lb: Lower second position
72Ub: Upper second position
73La: Lower edge first position
73Ua: Upper edge first position
73Lb: Lower edge second position
73Ub: Upper edge second position
74a: First representative position
74b: Second representative position
76: Virtual line
76L: Lower virtual line
76U: Upper virtual line
77La: Lower first virtual line
77Ua: Upper first virtual line
77Lb: Lower second virtual line
77Ub: Upper second virtual line
79: Reference measurement region 80: Flange surface indicated by reference three-dimensional shape data
81: Reference position indicated by reference three-dimensional shape data
82: Surface inclined with respect to flange surface indicated by reference three-dimensional shape data
83: Three-dimensional block
85: Point
86, 86a, 86b: Polygon (polygon plane)
87: Representative point
Ar: Axis
Dc: Circumferential direction
Dr: Radial direction
Dri: Radial inner side
Dro: Radial outer side
Dx: Lateral direction
Dy: Axial direction
Dz: Vertical direction
Dw: Flange width direction

The invention claimed is:

1. A method for estimating a flange displacement amount in a rotary machine,
the rotary machine comprising:
a rotor rotatable around an axis extending in a horizontal direction;
a casing covering an outer periphery of the rotor;
a stationary component disposed in the casing and attached to the casing; and
a base frame supporting the casing from below,
the casing comprising an upper-half casing on an upper side, a lower-half casing on a lower side, and a plurality of bolts fastening the upper-half casing to the lower-half casing,
the upper-half casing comprising an upper flange formed with an upper flange surface facing downward,
the lower-half casing comprising a lower flange formed with a lower flange surface facing upward and opposing the upper flange surface in a vertical direction and a first supported portion and a second supported portion continuous with the lower flange, supported by the base frame from below, and separated from each other in an axial direction in which the axis extends, and
the upper flange and the lower flange comprising bolt holes which penetrate therethrough in the vertical direction, the respective plurality of bolts being insertable into the bolt holes,
the method performing:
a measured coordinate receiving step of receiving measured three-dimensional coordinate data at a plurality of positions on the upper flange surface and measured three-dimensional coordinate data at a plurality of positions on the lower flange surface, the measured three-dimensional coordinate data being measured in an open state where the upper-half casing is not fastened to the lower-half casing by the plurality of bolts after the rotary machine is disassembled;
an effective coordinate determining step of determining effective three-dimensional coordinate data at a lower first position, a lower second position, and a lower target position by using the measured three-dimensional coordinate data at the plurality of positions on the lower flange surface, the lower first position being coincident with a first representative position of the first supported portion in a horizontal direction on a surface continuous with the lower flange surface, the lower second position being coincident with a second representative position of the second supported portion in the horizontal direction on a surface continuous with the lower flange surface, and the lower target position being a position on the lower flange surface from which a displacement amount in the vertical direction when a state changes from the open state to a fastened state where the upper-half casing is fastened to the lower-half casing by the plurality of bolts is to be obtained and determining effective three-dimensional coordinate data at an upper first position, an upper second position, and an upper target position by using the measured three-dimensional coordinate data at the plurality of positions on the upper flange surface, the upper first position being coincident with the first representative position of the first supported portion in the horizontal direction on a surface continuous with the upper flange surface, the upper second position being coincident with the second representative position of the second supported portion in the horizontal direction on a surface continuous with the upper flange surface, and the upper target position being coincident with the lower target position in the horizontal direction on the upper flange surface;
a coordinate change step of changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other and that the effective three-dimensional coordinate data at the lower second position and the effective three-dimensional coordinate data at the upper second position determined in the effective coordinate determining step are coincident with each other; and
a displacement amount calculation step of calculating a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after the coordinate change step and a position in the vertical direction indicated by the effective three-dimensional coordinate data at the lower target position after the coordinate change step.

2. The method for estimating a flange displacement amount in a rotary machine according to claim 1, wherein in the displacement amount calculation step, one-half of the difference is used as the displacement amount of the upper target position and the displacement amount of the lower target position.

3. The method for estimating a flange displacement amount in a rotary machine according to claim 1, wherein the lower target position is a position at which the stationary component is disposed in the axial direction and is a position at an inner side edge on the lower flange surface.

4. The method for estimating a flange displacement amount in a rotary machine according to claim 1, wherein
in the measured coordinate receiving step, measured three-dimensional coordinate data at the lower first position and the lower second position are received, and
in the effective coordinate determining step, the measured three-dimensional coordinate data at the lower first position and the lower second position acquired in the measured coordinate receiving step are determined to be effective three-dimensional coordinate data at the lower first position and the lower second position as is.

5. The method for estimating a flange displacement amount in a rotary machine according to claim 1, wherein
in the measured coordinate receiving step, measured three-dimensional coordinate data at a plurality of positions on an upper surface of the first supported portion and measured three-dimensional coordinate data at a plurality of positions on an upper surface of the second supported portion are received, and
in the effective coordinate determining step, effective three-dimensional coordinate data at the lower first position is obtained from the measured three-dimensional coordinate data at the plurality of positions on the upper surface of the first supported portion acquired in the measured coordinate receiving step, and effective three-dimensional coordinate data at the lower second position is obtained from the measured three-dimensional coordinate data at the plurality of positions on the upper surface of the second supported portion acquired in the measured coordinate receiving step.

6. The method for estimating a flange displacement amount in a rotary machine according to claim 1, wherein
in the measured coordinate receiving step, measured three-dimensional coordinate data of the lower target position and the upper target position are received, and
in the effective coordinate determining step, the measured three-dimensional coordinate data of the lower target position is determined to be effective three-dimensional coordinate data of the lower target position as is, and the measured three-dimensional coordinate data of the upper target position acquired in the measured coordinate receiving step is determined to be effective three-dimensional coordinate data of the upper target position as is.

7. The method for estimating a flange displacement amount in a rotary machine according to claim 1, wherein
in the measured coordinate receiving step, measured three-dimensional coordinate data at a plurality of positions on a lower virtual line passing through the lower target position and extending in a flange width direction are received, and measured three-dimensional coordinate data at a plurality of positions on an upper virtual line passing through the upper target position and extending in the flange width direction are received, and
in the effective coordinate determining step, effective three-dimensional coordinate data of the lower target position is obtained from the measured three-dimensional coordinate data at the plurality of positions on the lower virtual line, and effective three-dimensional coordinate data of the upper target position is obtained from the measured three-dimensional coordinate data at the plurality of positions on the upper virtual line.

8. The method for estimating a flange displacement amount in a rotary machine according to claim 1, wherein
in the measured coordinate receiving step, measured three-dimensional coordinate data at a plurality of positions in a lower measurement region including the lower target position on the lower flange surface are received, and measured three-dimensional coordinate data at a plurality of positions in an upper measurement region including the upper target position on the upper flange surface are received, and
in the effective coordinate determining step, effective three-dimensional coordinate data of the lower target position is obtained by using the measured three-dimensional coordinate data at the plurality of positions in the lower measurement region received in the measured coordinate receiving step, and effective three-dimensional coordinate data of the upper target position is obtained by using the measured three-dimensional coordinate data at the plurality of positions in the upper measurement region received in the measured coordinate receiving step.

9. The method for estimating a flange displacement amount in a rotary machine according to claim 1, wherein
in the measured coordinate receiving step, measured three-dimensional coordinate data at a plurality of positions over an entirety of the lower flange surface and measured three-dimensional coordinate data at a plurality of positions over an entirety of the upper flange surface are received, and
in the effective coordinate determining step,
shape data of the lower flange surface indicating a three-dimensional shape of the entirety of the lower flange surface is obtained by using the measured three-dimensional coordinate data at the plurality of positions over the entirety of the lower flange surface received in the measured coordinate receiving step, and shape data of the upper flange surface indicating a three-dimensional shape of the entirety of the upper flange surface is obtained by using the measured three-dimensional coordinate data at the plurality of positions over the entirety of the upper flange surface received in the measured coordinate receiving step, and
effective three-dimensional coordinate data of the lower target position is obtained by using the shape data of the lower flange surface, and effective three-dimensional coordinate data of the upper target position is obtained by using the shape data of the upper flange surface.

10. A non-transitory computer-readable storage medium storing a computer program for estimating a flange displacement amount in a rotary machine,
the rotary machine comprising:
a rotor rotatable around an axis extending in a horizontal direction;
a casing covering an outer periphery of the rotor;
a stationary component disposed in the casing and attached to the casing; and
a base frame supporting the casing from below,
the casing comprising an upper-half casing on an upper side, a lower-half casing on a lower side, and a plurality of bolts fastening the upper-half casing to the lower-half casing,
the upper-half casing comprising an upper flange formed with an upper flange surface facing downward,
the lower-half casing comprising a lower flange formed with a lower flange surface facing upward and opposing the upper flange surface in a vertical direction and a first supported portion and a second supported portion continuous with the lower flange, supported by the base frame from below, and separated from each other in an axial direction in which the axis extends, and
the upper flange and the lower flange comprising bolt holes which penetrate therethrough in the vertical direction, the respective plurality of bolts being insertable into the bolt holes,
the program causing a computer to execute:
a measured coordinate receiving step of receiving measured three-dimensional coordinate data at a plurality of positions on the upper flange surface and measured three-dimensional coordinate data at a plurality of positions on the lower flange surface, the measured three-dimensional coordinate data being measured in an open state where the upper-half casing is not fastened to the lower-half casing by the plurality of bolts after the rotary machine is disassembled;

an effective coordinate determining step of determining effective three-dimensional coordinate data at a lower first position, a lower second position, and a lower target position by using the measured three-dimensional coordinate data at the plurality of positions on the lower flange surface, the lower first position being coincident with a first representative position of the first supported portion in a horizontal direction on a surface continuous with the lower flange surface, the lower second position being coincident with a second representative position of the second supported portion in the horizontal direction on a surface continuous with the lower flange surface, and the lower target position being a position on the lower flange surface from which a displacement amount in a vertical direction when a state changes from the open state to a fastened state where the upper-half casing is fastened to the lower-half casing by the plurality of bolts is to be obtained, and determining effective three-dimensional coordinate data at an upper first position, an upper second position, and an upper target position by using the measured three-dimensional coordinate data at the plurality of positions on the upper flange surface, the upper first position being coincident with the first representative position of the first supported portion in the horizontal direction on a surface continuous with the upper flange surface, the upper second position being coincident with the second representative position of the second supported portion in the horizontal direction on a surface continuous with the upper flange surface, and the upper target position being coincident with the lower target position in the horizontal direction on the upper flange surface;

a coordinate change step of changing the effective three-dimensional coordinate data determined in the effective coordinate determining step such that the effective three-dimensional coordinate data at the lower first position and the effective three-dimensional coordinate data at the upper first position determined in the effective coordinate determining step are coincident with each other and that the effective three-dimensional coordinate data at the lower second position and the effective three-dimensional coordinate data at the upper second position determined in the effective coordinate determining step are coincident with each other; and a displacement amount calculation step of calculating a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after the coordinate change step and a position in the vertical direction indicated by the effective three-dimensional coordinate data at the lower target position after the coordinate change step.

11. The non-transitory computer-readable storage medium storing the computer program for estimating a flange displacement amount in a rotary machine according to claim 10, wherein in the displacement amount calculation step, one-half of the difference is used as the displacement amount of the upper target position and the displacement amount of the lower target position.

12. A device for estimating a flange displacement amount in a rotary machine, the rotary machine comprising:
a rotor rotatable around an axis extending in a horizontal direction;
a casing covering an outer periphery of the rotor;
a stationary component disposed in the casing and attached to the casing; and
a base frame supporting the casing from below,
the casing comprising an upper-half casing on an upper side, a lower-half casing on a lower side, and a plurality of bolts fastening the upper-half casing to the lower-half casing,
the upper-half casing comprising an upper flange formed with an upper flange surface facing downward,
the lower-half casing comprising a lower flange formed with a lower flange surface facing upward and opposing the upper flange surface in a vertical direction and a first supported portion and a second supported portion continuous with the lower flange, supported by the base frame from below, and separated from each other in an axial direction in which the axis extends, and
the upper flange and the lower flange comprising bolt holes which penetrate therethrough in the vertical direction, the respective plurality of bolts being insertable into the bolt holes, the device comprising:
a measured coordinate receiving unit configured to receive measured three-dimensional coordinate data at a plurality of positions on the upper flange surface and measured three-dimensional coordinate data at a plurality of positions on the lower flange surface, the measured three-dimensional coordinate data being measured in an open state where the upper-half casing is not fastened to the lower-half casing by the plurality of bolts after the rotary machine is disassembled;

an effective coordinate determining unit configured to determine effective three-dimensional coordinate data at a lower first position, a lower second position, and a lower target position by using the measured three-dimensional coordinate data at the plurality of positions on the lower flange surface, the lower first position being coincident with a first representative position of the first supported portion in a horizontal direction on a surface continuous with the lower flange surface, the lower second position being coincident with a second representative position of the second supported portion in the horizontal direction on a surface continuous with the lower flange surface, and the lower target position being a position on the lower flange surface from which a displacement amount in the vertical direction when a state changes from the open state to a fastened state where the upper-half casing is fastened to the lower-half casing by the plurality of bolts is to be obtained and determine effective three-dimensional coordinate data at an upper first position, an upper second position, and an upper target position by using the measured three-dimensional coordinate data at the plurality of positions on the upper flange surface, the upper first position being coincident with the first representative position of the first supported portion in the horizontal direction on a surface continuous with the upper flange surface, the upper second position being coincident with the second representative position of the second supported portion in the horizontal direction on a surface continuous with the upper flange surface, and the upper target position being coincident with the lower target position in the horizontal direction on the upper flange surface;

a coordinate change unit configured to change the effective three-dimensional coordinate data determined by the effective coordinate determining unit such that the effective three-dimensional coordinate data at the lower first position and the effective three- dimensional coordinate data at the upper first position determined by the effective coordinate determining unit are coincident with each other and that the effective three-dimensional coordinate data at the lower second position and the effective three-dimensional coordinate data at the upper second position determined by the effective coordinate determining unit are coincident with each other; and a displacement amount calculation unit configured to calculate a displacement amount of the upper target position in the vertical direction and a displacement amount of the lower target position in the vertical direction when a state changes from the open state to the fastened state in accordance with a difference between a position in the vertical direction indicated by the effective three-dimensional coordinate data at the upper target position after change of a coordinate and a position in the vertical direction indicated by the effective three-dimensional coordinate data at the lower target position after a coordinate change.

13. The device for estimating a flange displacement amount in a rotary machine according to claim 12, wherein the displacement amount calculation unit uses one-half of the difference as the displacement amount of the upper target position and the displacement amount of the lower target position.

* * * * *